United States Patent
Aloni et al.

(10) Patent No.: US 9,665,880 B2
(45) Date of Patent: May 30, 2017

(54) LOYALTY INCENTIVE PROGRAM USING TRANSACTION CARDS

(75) Inventors: Ruth L. Aloni, New York, NY (US); Benzion T. Axelrod, West Nyack, NY (US); Jean L. Bowman, Cave Creek, AZ (US); Jack J. Funda, Summit, NJ (US); Jonathan S. Polon, New York, NY (US); Sripriya V. Tiku, Scottsdale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 13/476,910

(22) Filed: May 21, 2012

(65) Prior Publication Data

US 2012/0226534 A1 Sep. 6, 2012

Related U.S. Application Data

(63) Continuation of application No. 11/779,734, filed on Jul. 18, 2007, now Pat. No. 9,430,773.

(Continued)

(51) Int. Cl.
*G06Q 30/00* (2012.01)
*G06Q 30/02* (2012.01)
*G06Q 20/10* (2012.01)

(52) U.S. Cl.
CPC ......... *G06Q 30/0226* (2013.01); *G06Q 20/10* (2013.01); *G06Q 30/02* (2013.01);

(Continued)

(58) Field of Classification Search
USPC ........... 705/14.38, 14.34, 14.36, 14.3, 14.17, 705/14.1, 39, 26.1
See application file for complete search history.

(56) References Cited

U.S. PATENT DOCUMENTS 4,833,308 A 5/1989 Humble
4,882,675 A 11/1989 Nichtberger et al.
(Continued)

FOREIGN PATENT DOCUMENTS

WO 0186378 11/2001
WO 2012024109 2/2012
(Continued)

OTHER PUBLICATIONS

PCT; International Search Report and Written Opinion dated May 8, 2012 in Application No. PCT/US2012/021648.
(Continued)

*Primary Examiner* — Luis A Brown
(74) *Attorney, Agent, or Firm* — Snell & Wilmer L.L.P.

(57) ABSTRACT

A system and method provide rewards or loyalty incentives to card member customers. The system includes an enrolled card member customer database, an enrolled merchant database, a participating merchant offer database and a registered card processor. The registered card processor receives a record for charge for a purchase made with an enrolled merchant by an enrolled card member customer and uses the record of charge to determine whether the purchase qualifies for a rebate credit in accordance with a discount offer from the enrolled merchant. If the purchase qualifies for a rebate credit, the registered card processor provides the rebate credit to an account of the enrolled card member customer. The system provides a coupon-less way for merchants to provide incentive discounts to enrolled customers.

20 Claims, 13 Drawing Sheets

Related U.S. Application Data

(60) Provisional application No. 60/831,457, filed on Jul. 18, 2006.

(52) U.S. Cl.
CPC ..... *G06Q 30/0234* (2013.01); *G06Q 30/0236* (2013.01); *G06Q 30/0238* (2013.01)

(56) References Cited

U.S. PATENT DOCUMENTS

| | | | |
|---|---|---|---|
| 5,025,372 A * | 6/1991 | Burton et al. | ............. 705/14.17 |
| 5,467,269 A | 11/1995 | Flaten | |
| 5,471,669 A | 11/1995 | Lidman | |
| 5,729,693 A | 3/1998 | Holda-Fleck | |
| 5,918,211 A | 6/1999 | Sloane | |
| 5,923,016 A | 7/1999 | Fredregill et al. | |
| 5,948,040 A | 9/1999 | DeLorme et al. | |
| 5,953,706 A | 9/1999 | Patel | |
| 6,009,411 A * | 12/1999 | Kepecs | ................ G06Q 20/387 705/14.17 |
| 6,018,718 A | 1/2000 | Walker et al. | |
| 6,035,280 A | 3/2000 | Christensen | |
| 6,039,244 A | 3/2000 | Finsterwald | |
| 6,222,914 B1 | 4/2001 | McMullin | |
| 6,266,649 B1 | 7/2001 | Linden et al. | |
| 6,321,208 B1 | 11/2001 | Barnett et al. | |
| 6,330,543 B1 | 12/2001 | Kepecs | |
| 6,332,126 B1 | 12/2001 | Peirce et al. | |
| 6,336,099 B1 | 1/2002 | Barnett et al. | |
| 6,343,317 B1 | 1/2002 | Glorikian | |
| 6,360,167 B1 | 3/2002 | Millington et al. | |
| 6,370,514 B1 | 4/2002 | Messner | |
| 6,381,603 B1 | 4/2002 | Chan et al. | |
| 6,414,635 B1 | 7/2002 | Stewart et al. | |
| 6,430,539 B1 | 8/2002 | Lazarus et al. | |
| 6,434,534 B1 | 8/2002 | Walker et al. | |
| 6,542,814 B2 | 4/2003 | Polidi et al. | |
| 6,584,448 B1 | 6/2003 | Laor | |
| 6,587,835 B1 | 7/2003 | Treyz et al. | |
| 6,606,619 B2 | 8/2003 | Ortega et al. | |
| 6,691,915 B1 | 2/2004 | Thaxton et al. | |
| 6,738,711 B2 | 5/2004 | Ohmura et al. | |
| 6,748,365 B1 | 6/2004 | Quinlan et al. | |
| 6,882,290 B2 | 4/2005 | French et al. | |
| 6,883,708 B1 | 4/2005 | Fiedler et al. | |
| 6,904,408 B1 | 6/2005 | McCarthy et al. | |
| 6,915,265 B1 | 7/2005 | Johnson | |
| 6,937,995 B1 | 8/2005 | Kepecs | |
| 7,003,476 B1 | 2/2006 | Samra et al. | |
| 7,010,497 B1 | 3/2006 | Nyhan et al. | |
| 7,016,856 B1 | 3/2006 | Wiggins | |
| 7,016,860 B2 | 3/2006 | Modani et al. | |
| 7,054,830 B1 | 5/2006 | Eggleston et al. | |
| 7,072,851 B1 | 7/2006 | Wilcox et al. | |
| 7,107,238 B2 | 9/2006 | Hatakama et al. | |
| 7,120,591 B1 | 10/2006 | Solomon et al. | |
| 7,139,793 B2 | 11/2006 | Lala et al. | |
| 7,146,328 B1 | 12/2006 | Solomon et al. | |
| 7,165,037 B2 | 1/2007 | Lazarus et al. | |
| 7,302,429 B1 | 11/2007 | Wanker | |
| 7,392,224 B1 | 6/2008 | Bauer et al. | |
| 7,428,505 B1 | 9/2008 | Levy et al. | |
| 7,430,521 B2 | 9/2008 | Walker et al. | |
| 7,455,226 B1 * | 11/2008 | Hammond | ........... G06Q 10/087 235/376 |
| 7,472,073 B1 * | 12/2008 | Masi | ......... 705/14.38 |
| 7,493,268 B2 | 2/2009 | Kepros et al. | |
| 7,496,520 B1 | 2/2009 | Handel et al. | |
| 7,499,889 B2 | 3/2009 | Golan et al. | |
| 7,506,805 B1 | 3/2009 | Chakravarthy | |
| 7,512,551 B2 | 3/2009 | Postrel | |
| 7,596,566 B1 | 9/2009 | Patwardhan | |
| 7,599,858 B1 | 10/2009 | Grady et al. | |
| 7,618,318 B2 | 11/2009 | Ciancio et al. | |
| 7,630,935 B2 | 12/2009 | Loeger et al. | |
| 7,647,278 B1 * | 1/2010 | Foth | ........ G06Q 20/10 380/270 |
| 7,653,572 B1 | 1/2010 | Thompson | |
| 7,660,743 B1 | 2/2010 | Messa et al. | |
| 7,665,660 B2 | 2/2010 | Degliantoni et al. | |
| 7,668,749 B2 | 2/2010 | Kepros et al. | |
| 7,676,467 B1 | 3/2010 | Kozyrczak et al. | |
| 7,681,786 B1 | 3/2010 | Chakravarthy | |
| 7,706,808 B1 | 4/2010 | Aggarwal et al. | |
| 7,711,586 B2 | 5/2010 | Aggarwal et al. | |
| 7,734,486 B2 | 6/2010 | Mortimore, Jr. | |
| 7,739,134 B2 | 6/2010 | Mortimore, Jr. | |
| 7,742,954 B1 | 6/2010 | Handel et al. | |
| 7,743,002 B2 | 6/2010 | Hernandez | |
| 7,747,524 B2 | 6/2010 | Brown | |
| 7,752,328 B2 | 7/2010 | Mortimore, Jr. et al. | |
| 7,765,119 B2 | 7/2010 | Messa et al. | |
| 7,788,141 B1 | 8/2010 | Sim | |
| 7,797,199 B2 | 9/2010 | Forshaw et al. | |
| 7,801,760 B2 | 9/2010 | Handel et al. | |
| 7,806,328 B2 | 10/2010 | Chakravarthy | |
| 7,814,029 B1 | 10/2010 | Siegel | |
| 7,844,488 B2 | 11/2010 | Merriman et al. | |
| 7,844,490 B2 | 11/2010 | Patterson | |
| 7,865,513 B2 | 1/2011 | Welch et al. | |
| 7,870,022 B2 | 1/2011 | Bous et al. | |
| 7,899,704 B1 | 3/2011 | Thompson | |
| 7,925,540 B1 | 4/2011 | Orttung et al. | |
| 7,933,810 B2 | 4/2011 | Morgenstern | |
| 7,937,330 B2 | 5/2011 | Handel et al. | |
| 7,941,374 B2 | 5/2011 | Orttung et al. | |
| 7,958,017 B1 | 6/2011 | Rempe et al. | |
| 7,962,381 B2 | 6/2011 | Handel et al. | |
| 7,966,213 B2 | 6/2011 | Messa et al. | |
| 7,970,666 B1 | 6/2011 | Handel | |
| 7,991,664 B1 | 8/2011 | Stone | |
| 8,073,719 B2 | 12/2011 | Orttung et al. | |
| 8,078,496 B2 | 12/2011 | Postrel | |
| 8,082,270 B2 | 12/2011 | Goyal | |
| 8,090,707 B1 | 1/2012 | Orttung et al. | |
| 8,095,402 B2 | 1/2012 | Orttung et al. | |
| 8,108,304 B2 | 1/2012 | Loeger et al. | |
| 8,117,073 B1 | 2/2012 | Orttung et al. | |
| 8,121,953 B1 | 2/2012 | Orttung et al. | |
| 8,126,771 B2 | 2/2012 | Walker et al. | |
| 8,126,776 B2 | 2/2012 | Messa et al. | |
| 8,131,588 B2 | 3/2012 | Walker et al. | |
| 8,140,387 B2 | 3/2012 | Heywood | |
| 8,145,522 B2 | 3/2012 | Warren et al. | |
| 8,160,922 B2 | 4/2012 | Postrel | |
| 8,170,916 B1 | 5/2012 | Dicker et al. | |
| 8,175,926 B1 | 5/2012 | Handel et al. | |
| 8,180,682 B2 | 5/2012 | Narayanaswami et al. | |
| 8,180,796 B1 | 5/2012 | Mah et al. | |
| 8,213,423 B1 | 7/2012 | Breau | |
| 8,249,934 B2 | 8/2012 | Agarwal et al. | |
| 8,438,061 B2 | 5/2013 | Grimes | |
| 8,459,551 B2 | 6/2013 | Lee et al. | |
| 8,463,643 B2 | 6/2013 | Bennett | |
| 8,463,706 B2 | 6/2013 | Cervenka et al. | |
| 8,463,851 B2 | 6/2013 | Bennett et al. | |
| 8,468,053 B2 | 6/2013 | Bennett | |
| 8,473,334 B2 | 6/2013 | Gibbs | |
| 8,484,088 B1 | 7/2013 | Orttung et al. | |
| 8,484,093 B2 | 7/2013 | Bennett et al. | |
| 8,489,456 B2 | 7/2013 | Burgess et al. | |
| 8,494,901 B2 | 7/2013 | Magadi et al. | |
| 8,494,914 B2 | 7/2013 | Mesaros | |
| 8,504,423 B2 | 8/2013 | Rotbard et al. | |
| 8,515,810 B2 | 8/2013 | Grimes | |
| 8,517,258 B2 | 8/2013 | Taylor et al. | |
| 8,543,470 B2 | 9/2013 | Grady et al. | |
| 8,560,389 B2 | 10/2013 | Burgess et al. | |
| 8,573,477 B2 | 11/2013 | Bennett et al. | |
| 8,573,491 B2 | 11/2013 | Bennett et al. | |
| 8,606,630 B2 | 12/2013 | Fordyce, III et al. | |
| 8,615,426 B2 | 12/2013 | Carlson | |
| 8,621,068 B2 | 12/2013 | Zohar et al. | |

(56) References Cited

U.S. PATENT DOCUMENTS

| | | |
|---|---|---|
| 8,621,215 B1 | 12/2013 | Iyer |
| 8,626,579 B2 | 1/2014 | Fordyce, III et al. |
| 8,639,567 B2 | 1/2014 | Winters |
| 8,650,071 B2 | 2/2014 | Pointer et al. |
| 8,655,695 B1 | 2/2014 | Qu |
| 8,725,635 B2 | 5/2014 | Klein et al. |
| 8,874,674 B2 | 10/2014 | Allison et al. |
| 9,009,082 B1 | 4/2015 | Marshall et al. |
| 9,031,866 B1 | 5/2015 | Ng et al. |
| 9,430,773 B2 | 8/2016 | Aloni et al. |
| 2001/0014868 A1 | 8/2001 | Herz et al. |
| 2001/0020242 A1 | 9/2001 | Gupta et al. |
| 2001/0037254 A1 | 11/2001 | Glikman |
| 2001/0054003 A1 | 12/2001 | Chien et al. |
| 2002/0052841 A1 | 5/2002 | Guthrie |
| 2002/0069079 A1 | 6/2002 | Vega |
| 2002/0069312 A1 | 6/2002 | Jones |
| 2002/0082920 A1 | 6/2002 | Austin et al. |
| 2002/0095357 A1 | 7/2002 | Hunter et al. |
| 2002/0099824 A1 | 7/2002 | Bender |
| 2002/0138343 A1 | 9/2002 | Weatherford et al. |
| 2002/0178056 A1 | 11/2002 | Lim |
| 2003/0004802 A1 | 1/2003 | Callegari |
| 2003/0027630 A1 | 2/2003 | Kelly et al. |
| 2003/0028518 A1 | 2/2003 | Mankoff |
| 2003/0033211 A1* | 2/2003 | Haines et al. ............. 705/26 |
| 2003/0061093 A1 | 3/2003 | Todd |
| 2003/0078832 A1 | 4/2003 | Alvarez et al. |
| 2003/0208442 A1* | 11/2003 | Cockrill et al. ........... 705/40 |
| 2003/0233278 A1 | 12/2003 | Marshall |
| 2004/0006509 A1 | 1/2004 | Mannik et al. |
| 2004/0039686 A1 | 2/2004 | Klebanoff |
| 2004/0098326 A1 | 5/2004 | James |
| 2004/0098332 A1 | 5/2004 | Dvir |
| 2004/0122736 A1* | 6/2004 | Strock et al. ............. 705/14 |
| 2004/0153389 A1 | 8/2004 | Lortscher |
| 2004/0225509 A1 | 11/2004 | Andre et al. |
| 2004/0225573 A1 | 11/2004 | Ling |
| 2004/0243468 A1 | 12/2004 | Cohagan et al. |
| 2005/0010394 A1 | 1/2005 | Bergeron |
| 2005/0010428 A1 | 1/2005 | Bergeron |
| 2005/0010472 A1 | 1/2005 | Quatse et al. |
| 2005/0021401 A1 | 1/2005 | Postrel |
| 2005/0033583 A1 | 2/2005 | Bergeron |
| 2005/0033605 A1 | 2/2005 | Bergeron |
| 2005/0065848 A1 | 3/2005 | Mitchell et al. |
| 2005/0071225 A1 | 3/2005 | Bortolin et al. |
| 2005/0071227 A1 | 3/2005 | Hammad et al. |
| 2005/0071228 A1* | 3/2005 | Bortolin et al. ........... 705/14 |
| 2005/0071230 A1 | 3/2005 | Mankoff |
| 2005/0096976 A1 | 5/2005 | Nelms |
| 2005/0149394 A1 | 7/2005 | Postrel |
| 2005/0159996 A1 | 7/2005 | Lazarus |
| 2005/0192863 A1 | 9/2005 | Mohan |
| 2005/0240477 A1 | 10/2005 | Friday et al. |
| 2005/0246272 A1 | 11/2005 | Kitada et al. |
| 2005/0273388 A1 | 12/2005 | Roetter |
| 2006/0004633 A1 | 1/2006 | Ashbaugh |
| 2006/0026067 A1 | 2/2006 | Nicholas et al. |
| 2006/0041480 A1 | 2/2006 | Briggs |
| 2006/0053056 A1* | 3/2006 | Alspach-Goss et al. ....... 705/14 |
| 2006/0064372 A1* | 3/2006 | Gupta ................ G06Q 20/10 705/39 |
| 2006/0074749 A1 | 4/2006 | Kline |
| 2006/0076400 A1 | 4/2006 | Fletcher |
| 2006/0085240 A1 | 4/2006 | Salehi-sedeh et al. |
| 2006/0095434 A1 | 5/2006 | McCullough et al. |
| 2006/0111930 A1 | 5/2006 | Ayer et al. |
| 2006/0116800 A1 | 6/2006 | Obradovich et al. |
| 2006/0122874 A1 | 6/2006 | Postrel |
| 2006/0129426 A1* | 6/2006 | Pearson ................ 705/2 |
| 2006/0136299 A1 | 6/2006 | Ruhmkorf |
| 2006/0155603 A1* | 7/2006 | Abendroth et al. ............ 705/14 |
| 2006/0155641 A1 | 7/2006 | Postrel |
| 2006/0167753 A1 | 7/2006 | Teague et al. |
| 2006/0173672 A1 | 8/2006 | Bergeron |
| 2006/0178932 A1 | 8/2006 | Lang |
| 2006/0195359 A1* | 8/2006 | Robinson ............... G06Q 30/02 705/14.17 |
| 2006/0212355 A1 | 9/2006 | Teague et al. |
| 2006/0224449 A1* | 10/2006 | Byerley et al. ................. 705/14 |
| 2006/0241859 A1 | 10/2006 | Kimchi et al. |
| 2006/0242011 A1 | 10/2006 | Bell et al. |
| 2006/0253321 A1* | 11/2006 | Heywood ................ 705/14 |
| 2006/0258397 A1 | 11/2006 | Kaplan et al. |
| 2006/0259364 A1 | 11/2006 | Strock et al. |
| 2006/0271552 A1 | 11/2006 | McChesney et al. |
| 2007/0000997 A1 | 1/2007 | Lambert et al. |
| 2007/0010942 A1 | 1/2007 | Bill |
| 2007/0022019 A1 | 1/2007 | Sherwin et al. |
| 2007/0033104 A1 | 2/2007 | Collins et al. |
| 2007/0038515 A1 | 2/2007 | Postrel |
| 2007/0038516 A1 | 2/2007 | Apple et al. |
| 2007/0050258 A1 | 3/2007 | Dohse |
| 2007/0061216 A1 | 3/2007 | Jain et al. |
| 2007/0061223 A1 | 3/2007 | Rodriguez et al. |
| 2007/0073599 A1 | 3/2007 | Perry et al. |
| 2007/0083428 A1 | 4/2007 | Goldstein |
| 2007/0094114 A1* | 4/2007 | Bufford ................ G06Q 30/02 705/35 |
| 2007/0129995 A1 | 6/2007 | Brandow |
| 2007/0130000 A1 | 6/2007 | Assanassios |
| 2007/0136135 A1 | 6/2007 | Loeger et al. |
| 2007/0146812 A1 | 6/2007 | Lawton |
| 2007/0150349 A1 | 6/2007 | Handel et al. |
| 2007/0192178 A1 | 8/2007 | Fung et al. |
| 2007/0192192 A1 | 8/2007 | Haberman et al. |
| 2007/0198354 A1 | 8/2007 | Senghore et al. |
| 2007/0198432 A1 | 8/2007 | Pitroda et al. |
| 2007/0208879 A1 | 9/2007 | Liu |
| 2007/0210152 A1* | 9/2007 | Read ................ G06Q 30/02 235/380 |
| 2007/0214040 A1 | 9/2007 | Patel et al. |
| 2007/0233517 A1 | 10/2007 | Dayal |
| 2007/0244741 A1 | 10/2007 | Blume et al. |
| 2007/0244811 A1 | 10/2007 | Tumminaro |
| 2007/0260513 A1 | 11/2007 | Pavlov |
| 2007/0260523 A1* | 11/2007 | Schadt ................ G06Q 10/107 705/14.16 |
| 2007/0288312 A1 | 12/2007 | Wang |
| 2007/0288372 A1 | 12/2007 | Behar et al. |
| 2008/0004917 A1 | 1/2008 | Mortimore, Jr. |
| 2008/0004919 A1 | 1/2008 | Stubbs |
| 2008/0004980 A1 | 1/2008 | Hernandez |
| 2008/0005148 A1 | 1/2008 | Welch et al. |
| 2008/0021772 A1 | 1/2008 | Aloni et al. |
| 2008/0032720 A1 | 2/2008 | Mamdani et al. |
| 2008/0033857 A1* | 2/2008 | Moses ................ G06Q 20/342 705/35 |
| 2008/0040211 A1 | 2/2008 | Walker et al. |
| 2008/0040288 A1 | 2/2008 | Mortimore, Jr. et al. |
| 2008/0052140 A1 | 2/2008 | Neal et al. |
| 2008/0052151 A1 | 2/2008 | Xie et al. |
| 2008/0059220 A1 | 3/2008 | Roth et al. |
| 2008/0065491 A1 | 3/2008 | Bakman |
| 2008/0082418 A1 | 4/2008 | Fordyce et al. |
| 2008/0091445 A1 | 4/2008 | Mihic |
| 2008/0091528 A1 | 4/2008 | Rampell et al. |
| 2008/0091537 A1 | 4/2008 | Miller et al. |
| 2008/0091549 A1 | 4/2008 | Chang et al. |
| 2008/0091828 A1 | 4/2008 | Mortimore, Jr. |
| 2008/0092162 A1 | 4/2008 | Lundy et al. |
| 2008/0109317 A1 | 5/2008 | Singh et al. |
| 2008/0109489 A1 | 5/2008 | Sherwood |
| 2008/0120155 A1 | 5/2008 | Pliha |
| 2008/0126515 A1 | 5/2008 | Chambers et al. |
| 2008/0147450 A1 | 6/2008 | Mortimore, Jr. |
| 2008/0147514 A1 | 6/2008 | Shuster et al. |
| 2008/0147773 A1 | 6/2008 | Aaron |
| 2008/0154664 A1 | 6/2008 | Kuo et al. |
| 2008/0162206 A1 | 7/2008 | Mak et al. |
| 2008/0167991 A1 | 7/2008 | Carlson et al. |
| 2008/0189169 A1 | 8/2008 | Turpin et al. |
| 2008/0195475 A1 | 8/2008 | Lambert et al. |

(56) References Cited

U.S. PATENT DOCUMENTS

| | | |
|---|---|---|
| 2008/0196060 A1 | 8/2008 | Varghese |
| 2008/0201197 A1 | 8/2008 | Orttung et al. |
| 2008/0201224 A1 | 8/2008 | Owens et al. |
| 2008/0201432 A1 | 8/2008 | Orttung et al. |
| 2008/0210753 A1* | 9/2008 | Plozay et al. ................ 235/380 |
| 2008/0255940 A1 | 10/2008 | Perreault et al. |
| 2008/0262925 A1 | 10/2008 | Kim |
| 2008/0263135 A1 | 10/2008 | Olliphant |
| 2008/0270223 A1 | 10/2008 | Collins et al. |
| 2008/0270251 A1 | 10/2008 | Coelho et al. |
| 2008/0276270 A1 | 11/2008 | Kotaru et al. |
| 2008/0281710 A1 | 11/2008 | Hoal |
| 2008/0294624 A1 | 11/2008 | Kanigsberg et al. |
| 2008/0300894 A1 | 12/2008 | John |
| 2008/0300979 A1 | 12/2008 | Abhyanker |
| 2009/0006142 A1 | 1/2009 | Orttung et al. |
| 2009/0006143 A1 | 1/2009 | Orttung et al. |
| 2009/0006188 A1 | 1/2009 | Guo et al. |
| 2009/0006194 A1 | 1/2009 | Sridharan et al. |
| 2009/0012839 A1 | 1/2009 | Fusillo et al. |
| 2009/0018916 A1 | 1/2009 | Seven et al. |
| 2009/0030609 A1 | 1/2009 | Orttung et al. |
| 2009/0030742 A1 | 1/2009 | Orttung et al. |
| 2009/0030769 A1 | 1/2009 | Orttung et al. |
| 2009/0030779 A1 | 1/2009 | Tollinger et al. |
| 2009/0037264 A1 | 2/2009 | Del Favero et al. |
| 2009/0055292 A1 | 2/2009 | Chong et al. |
| 2009/0063268 A1 | 3/2009 | Burgess et al. |
| 2009/0063351 A1* | 3/2009 | Schmeyer ............. G06Q 10/02 705/64 |
| 2009/0076912 A1 | 3/2009 | Rajan et al. |
| 2009/0094048 A1* | 4/2009 | Wallace ................ G06Q 50/01 705/319 |
| 2009/0132347 A1 | 5/2009 | Anderson et al. |
| 2009/0140799 A1 | 6/2009 | Kasperkovitz |
| 2009/0150272 A1 | 6/2009 | Blythe |
| 2009/0156310 A1 | 6/2009 | Fargo |
| 2009/0163227 A1 | 6/2009 | Collins |
| 2009/0164314 A1 | 6/2009 | Blythe |
| 2009/0171842 A1 | 7/2009 | Blythe |
| 2009/0171853 A1 | 7/2009 | Georgiou et al. |
| 2009/0182718 A1 | 7/2009 | Waclawik et al. |
| 2009/0210261 A1 | 8/2009 | Mortimore, Jr. |
| 2009/0228365 A1 | 9/2009 | Tomchek et al. |
| 2009/0247193 A1 | 10/2009 | Kalavade |
| 2009/0247282 A1 | 10/2009 | Cheng |
| 2009/0248457 A1 | 10/2009 | Munter et al. |
| 2009/0248543 A1 | 10/2009 | Nihalani et al. |
| 2009/0259499 A1 | 10/2009 | Bhojwani et al. |
| 2009/0265236 A1 | 10/2009 | Schultz et al. |
| 2009/0271263 A1 | 10/2009 | Regmi et al. |
| 2009/0276306 A1 | 11/2009 | Hicks |
| 2009/0287562 A1 | 11/2009 | Bosch et al. |
| 2009/0288012 A1 | 11/2009 | Hertel et al. |
| 2009/0288140 A1 | 11/2009 | Huber |
| 2009/0289111 A1 | 11/2009 | Motycka et al. |
| 2009/0313109 A1 | 12/2009 | Bous et al. |
| 2009/0319353 A1 | 12/2009 | Palmeri |
| 2009/0327062 A1 | 12/2009 | Botes |
| 2009/0327174 A1 | 12/2009 | Honkala |
| 2010/0002722 A1 | 1/2010 | Porat |
| 2010/0057565 A1 | 3/2010 | Au-Yeung et al. |
| 2010/0076777 A1 | 3/2010 | Paretti et al. |
| 2010/0079336 A1 | 4/2010 | Skibiski et al. |
| 2010/0082418 A1 | 4/2010 | Loeger et al. |
| 2010/0082446 A1 | 4/2010 | Hjelm et al. |
| 2010/0088174 A1 | 4/2010 | Cohagan et al. |
| 2010/0094697 A1 | 4/2010 | Cananaugh |
| 2010/0094698 A1 | 4/2010 | Cawley |
| 2010/0094699 A1 | 4/2010 | Beal |
| 2010/0106568 A1 | 4/2010 | Grimes |
| 2010/0106569 A1 | 4/2010 | Grimes |
| 2010/0106578 A1 | 4/2010 | Allio et al. |
| 2010/0106596 A1 | 4/2010 | Grimes |
| 2010/0114661 A1 | 5/2010 | Alderfer |
| 2010/0114686 A1 | 5/2010 | Carlson et al. |
| 2010/0131342 A1 | 5/2010 | Thibedeau |
| 2010/0131840 A1 | 5/2010 | Walker et al. |
| 2010/0138299 A1 | 6/2010 | Preston et al. |
| 2010/0145744 A1 | 6/2010 | Beck et al. |
| 2010/0145762 A1 | 6/2010 | Coladonato et al. |
| 2010/0145778 A1 | 6/2010 | Fordyce et al. |
| 2010/0145786 A1 | 6/2010 | Fordyce, III et al. |
| 2010/0145860 A1 | 6/2010 | Pelegero |
| 2010/0153194 A1 | 6/2010 | Oram |
| 2010/0179879 A1 | 7/2010 | Cunningham et al. |
| 2010/0191572 A1 | 7/2010 | Newman et al. |
| 2010/0211419 A1 | 8/2010 | Nickolayev et al. |
| 2010/0228613 A1 | 9/2010 | Anderson et al. |
| 2010/0241502 A1 | 9/2010 | Walker et al. |
| 2010/0241559 A1 | 9/2010 | O'Connor et al. |
| 2010/0250351 A1 | 9/2010 | Gillenson et al. |
| 2010/0250356 A1 | 9/2010 | Gillenson et al. |
| 2010/0257047 A1 | 10/2010 | Foodman et al. |
| 2010/0262456 A1 | 10/2010 | Feng et al. |
| 2010/0312629 A1 | 12/2010 | Wolf et al. |
| 2010/0324990 A1 | 12/2010 | D'Angelo et al. |
| 2010/0332307 A1 | 12/2010 | Parento |
| 2011/0004497 A1 | 1/2011 | Mortimore, Jr. et al. |
| 2011/0022448 A1 | 1/2011 | Strock et al. |
| 2011/0022455 A1 | 1/2011 | Wolf et al. |
| 2011/0029363 A1 | 2/2011 | Gillenson et al. |
| 2011/0029364 A1 | 2/2011 | Roeding et al. |
| 2011/0029367 A1 | 2/2011 | Olson et al. |
| 2011/0035266 A1 | 2/2011 | Patterson |
| 2011/0040539 A1 | 2/2011 | Szymczyk et al. |
| 2011/0047023 A1 | 2/2011 | Lieblang et al. |
| 2011/0055880 A1 | 3/2011 | Archer |
| 2011/0066483 A1 | 3/2011 | Salmon et al. |
| 2011/0066548 A1 | 3/2011 | Rodin |
| 2011/0078030 A1 | 3/2011 | Borst et al. |
| 2011/0078055 A1 | 3/2011 | Faribault et al. |
| 2011/0083101 A1 | 4/2011 | Sharon et al. |
| 2011/0087530 A1 | 4/2011 | Fordyce et al. |
| 2011/0087531 A1 | 4/2011 | Winters et al. |
| 2011/0093327 A1 | 4/2011 | Fordyce et al. |
| 2011/0093335 A1 | 4/2011 | Fordyce et al. |
| 2011/0093361 A1 | 4/2011 | Morales |
| 2011/0106607 A1 | 5/2011 | Alfonso et al. |
| 2011/0119133 A1 | 5/2011 | Igelman et al. |
| 2011/0125561 A1 | 5/2011 | Marcus |
| 2011/0125565 A1 | 5/2011 | MacIlwaine et al. |
| 2011/0137716 A1 | 6/2011 | Reuthe et al. |
| 2011/0137717 A1 | 6/2011 | Reuthe et al. |
| 2011/0137721 A1 | 6/2011 | Bansal |
| 2011/0145047 A1 | 6/2011 | Chetty et al. |
| 2011/0145149 A1 | 6/2011 | Valdes et al. |
| 2011/0161149 A1 | 6/2011 | Kaplan |
| 2011/0161154 A1 | 6/2011 | McLaughlin et al. |
| 2011/0178928 A1 | 7/2011 | Carmichael et al. |
| 2011/0184792 A1 | 7/2011 | Butcher et al. |
| 2011/0191150 A1 | 8/2011 | Blackhurst et al. |
| 2011/0213670 A1 | 9/2011 | Strutton |
| 2011/0218031 A1 | 9/2011 | Bryant et al. |
| 2011/0225033 A1 | 9/2011 | Schmeyer et al. |
| 2011/0231224 A1 | 9/2011 | Winters |
| 2011/0231235 A1 | 9/2011 | MacIlwaine et al. |
| 2011/0231246 A1 | 9/2011 | Bhatia et al. |
| 2011/0238469 A1 | 9/2011 | Gershman et al. |
| 2011/0246280 A1 | 10/2011 | Satyavolu et al. |
| 2011/0246281 A1 | 10/2011 | Satyavolu et al. |
| 2011/0246287 A1 | 10/2011 | Wright et al. |
| 2011/0246299 A1 | 10/2011 | Satyavolu et al. |
| 2011/0251883 A1 | 10/2011 | Satyavolu et al. |
| 2011/0251891 A1 | 10/2011 | Satyavolu et al. |
| 2011/0251934 A1 | 10/2011 | Satyavolu et al. |
| 2011/0264490 A1 | 10/2011 | Durvasula et al. |
| 2011/0270617 A1 | 11/2011 | Pacheco E Murta et al. |
| 2011/0270666 A1 | 11/2011 | Welsh et al. |
| 2011/0276373 A1 | 11/2011 | Juszczak et al. |
| 2011/0276377 A1 | 11/2011 | Kim et al. |
| 2011/0282702 A1 | 11/2011 | Mortimore, Jr. |
| 2011/0288918 A1 | 11/2011 | Cervenka et al. |
| 2011/0295689 A1 | 12/2011 | Brady |

(56) References Cited

U.S. PATENT DOCUMENTS

| | | |
|---|---|---|
| 2011/0295749 A1 | 12/2011 | Scalisi |
| 2011/0302011 A1 | 12/2011 | Yoder et al. |
| 2011/0313840 A1 | 12/2011 | Mason et al. |
| 2011/0313874 A1 | 12/2011 | Hardie et al. |
| 2011/0320250 A1 | 12/2011 | Gemmell et al. |
| 2012/0004964 A1 | 1/2012 | Satyavolu et al. |
| 2012/0004965 A1 | 1/2012 | Satyavolu et al. |
| 2012/0004966 A1 | 1/2012 | Satyavolu et al. |
| 2012/0004967 A1 | 1/2012 | Satyavolu et al. |
| 2012/0004968 A1 | 1/2012 | Satyavolu et al. |
| 2012/0004969 A1 | 1/2012 | Satyavolu et al. |
| 2012/0004970 A1 | 1/2012 | Satyavolu et al. |
| 2012/0004975 A1 | 1/2012 | Satyavolu et al. |
| 2012/0010932 A1 | 1/2012 | Satyavolu et al. |
| 2012/0010933 A1 | 1/2012 | Satyavolu et al. |
| 2012/0010934 A1 | 1/2012 | Walker et al. |
| 2012/0010936 A1 | 1/2012 | Satyavolu et al. |
| 2012/0010937 A1 | 1/2012 | Hanson et al. |
| 2012/0022923 A1 | 1/2012 | Walker et al. |
| 2012/0023122 A1 | 1/2012 | Gregov et al. |
| 2012/0029996 A1 | 2/2012 | Lang et al. |
| 2012/0030048 A1 | 2/2012 | Manley et al. |
| 2012/0035997 A1 | 2/2012 | Burgess et al. |
| 2012/0036079 A1 | 2/2012 | Sushil et al. |
| 2012/0036178 A1 | 2/2012 | Gavini et al. |
| 2012/0046958 A1 | 2/2012 | Pynadath |
| 2012/0047008 A1 | 2/2012 | Alhadeff et al. |
| 2012/0053987 A1 | 3/2012 | Satyavolu et al. |
| 2012/0059701 A1 | 3/2012 | Van der Veen et al. |
| 2012/0066037 A1 | 3/2012 | Glen |
| 2012/0066046 A1 | 3/2012 | Satyavolu et al. |
| 2012/0066050 A1 | 3/2012 | Satyavolu et al. |
| 2012/0066051 A1 | 3/2012 | Black et al. |
| 2012/0066062 A1 | 3/2012 | Yoder et al. |
| 2012/0072270 A1 | 3/2012 | Waylonis et al. |
| 2012/0078689 A1 | 3/2012 | Rothschild |
| 2012/0101881 A1 | 4/2012 | Taylor et al. |
| 2012/0109751 A1 | 5/2012 | Binenstock et al. |
| 2012/0150740 A1 | 6/2012 | Isaacson et al. |
| 2012/0196568 A1 | 8/2012 | Bakshi |
| 2012/0197707 A1 | 8/2012 | Cohagan |
| 2012/0203604 A1 | 8/2012 | Baker et al. |
| 2012/0203846 A1 | 8/2012 | Hull et al. |
| 2012/0209672 A1 | 8/2012 | Winner et al. |
| 2012/0209695 A1 | 8/2012 | Winner et al. |
| 2012/0209696 A1 | 8/2012 | Winner et al. |
| 2012/0209771 A1 | 8/2012 | Winner et al. |
| 2012/0220308 A1 | 8/2012 | Ledlie |
| 2012/0221437 A1 | 8/2012 | Yoo |
| 2012/0221479 A1 | 8/2012 | Schneck et al. |
| 2012/0226530 A1 | 9/2012 | Gebb et al. |
| 2012/0239417 A1 | 9/2012 | Pourfallah |
| 2012/0239479 A1 | 9/2012 | Amaro et al. |
| 2012/0253852 A1 | 10/2012 | Pourfallah |
| 2012/0253957 A1 | 10/2012 | Bakshi |
| 2012/0278127 A1 | 11/2012 | Kirakosyan et al. |
| 2012/0296724 A1 | 11/2012 | Faro et al. |
| 2012/0303425 A1 | 11/2012 | Katzin et al. |
| 2012/0303430 A1 | 11/2012 | Tiku et al. |
| 2013/0013396 A1 | 1/2013 | Vinson et al. |
| 2013/0024256 A1 | 1/2013 | Wolf et al. |
| 2013/0040654 A1 | 2/2013 | Parish |
| 2013/0041902 A1 | 2/2013 | Swann et al. |
| 2013/0060623 A1 | 3/2013 | Walker et al. |
| 2013/0073336 A1 | 3/2013 | Heath |
| 2013/0073361 A1 | 3/2013 | Silver |
| 2013/0073366 A1 | 3/2013 | Heath |
| 2013/0073371 A1 | 3/2013 | Bosworth et al. |
| 2013/0073374 A1 | 3/2013 | Heath |
| 2013/0073376 A1 | 3/2013 | Heath |
| 2013/0073377 A1 | 3/2013 | Heath |
| 2013/0073387 A1 | 3/2013 | Heath |
| 2013/0073388 A1 | 3/2013 | Heath |
| 2013/0073389 A1 | 3/2013 | Heath |
| 2013/0073400 A1 | 3/2013 | Heath |
| 2013/0073473 A1 | 3/2013 | Heath |
| 2013/0073568 A1 | 3/2013 | Federov et al. |
| 2013/0091000 A1 | 4/2013 | Hagey et al. |
| 2013/0103472 A1 | 4/2013 | Burgess et al. |
| 2013/0110555 A1 | 5/2013 | Dunham |
| 2013/0110604 A1 | 5/2013 | Rooke et al. |
| 2013/0124283 A1 | 5/2013 | Kaulbach |
| 2013/0132175 A1 | 5/2013 | Claessen et al. |
| 2013/0132183 A1 | 5/2013 | Klein et al. |
| 2013/0145016 A1 | 6/2013 | Vantalon |
| 2013/0151602 A1 | 6/2013 | McClelland et al. |
| 2013/0173320 A1 | 7/2013 | Bank et al. |
| 2013/0173478 A1 | 7/2013 | Farhi |
| 2013/0178280 A1 | 7/2013 | Ganz |
| 2013/0179246 A1 | 7/2013 | Ross et al. |
| 2013/0191195 A1 | 7/2013 | Carlson et al. |
| 2013/0212177 A1 | 8/2013 | Friedman |
| 2013/0218653 A1 | 8/2013 | Rooke et al. |
| 2013/0238412 A1 | 9/2013 | Boncyk et al. |
| 2013/0246146 A1 | 9/2013 | Fischer et al. |
| 2013/0246185 A1 | 9/2013 | Hardman et al. |
| 2013/0260727 A1 | 10/2013 | Knudson et al. |
| 2013/0262209 A1 | 10/2013 | Boyer |
| 2013/0268333 A1 | 10/2013 | Ovick et al. |
| 2013/0275192 A1 | 10/2013 | Aissa |
| 2013/0304563 A1 | 11/2013 | Haupt et al. |
| 2013/0325946 A1 | 12/2013 | Allison, Jr. et al. |
| 2013/0346170 A1 | 12/2013 | Epstein et al. |
| 2014/0006129 A1 | 1/2014 | Heath |
| 2014/0006132 A1 | 1/2014 | Barker |
| 2014/0025451 A1 | 1/2014 | Knowles et al. |
| 2014/0025452 A1 | 1/2014 | Knowles et al. |
| 2014/0025453 A1 | 1/2014 | Knowles et al. |
| 2014/0025460 A1 | 1/2014 | Knowles et al. |
| 2014/0046675 A1 | 2/2014 | Harwood |
| 2014/0046744 A1 | 2/2014 | Hagey |
| 2014/0046748 A1 | 2/2014 | Nagarajan et al. |
| 2014/0108108 A1 | 4/2014 | Artman et al. |
| 2014/0164199 A1 | 6/2014 | Wilkes |
| 2015/0039393 A1 | 2/2015 | Jain |
| 2015/0170256 A1 | 6/2015 | Pettyjohn |
| 2015/0248702 A1 | 9/2015 | Chatterton |

FOREIGN PATENT DOCUMENTS

| | | |
|---|---|---|
| WO | 2012106114 | 8/2012 |
| WO | 2012170088 | 12/2012 |
| WO | 2013015846 | 1/2013 |
| WO | 2014106207 | 7/2014 |
| WO | 2015102889 | 7/2015 |
| WO | 2015134947 | 9/2015 |

OTHER PUBLICATIONS

PCT; International Search Report and Written Opinion dated Jun. 19, 2012 in Application No. PCT/US2012/027810.
PCT; International Search Report and Written Opinion dated Jul. 6, 2012 in Application No. PCT/US2012/027664.
USPTO; Final Office Action dated Apr. 11, 2011 in U.S. Appl. No. 12/857,389.
USPTO; Final Office Action dated Apr. 5, 2011 in U.S. Appl. No. 12/857,424.
Todorova, Aleksandra, "The Best Rewards Programs," www.smartmoney.com, Sep. 2005, pp. 1-2.
Todorova, Aleksandra, "Capital One Tests a New Type of Debit Card," www.smartmoney.com, Jun. 2007, pp. 1-2.
Nickel, "Citi Thank You Redemptions: No Thanks," www.fivecentnickel.com, Sep. 2005.
www.americanexpress.com/gift Feb. 25, 2005.
USPTO; Office Action dated Nov. 26, 2010 in U.S. Appl. No. 12/857,424.
USPTO; Office Action dated Nov. 26, 2010 in U.S. Appl. No. 12/857,389.
USPTO; Office Action dated Apr. 30, 2010 in U.S. Appl. No. 11/779,737.
USPTO; Advisory Action dated Jan. 6, 2011 in U.S. Appl. No. 11/779,737.

(56) References Cited

OTHER PUBLICATIONS

USPTO; Final Office Action dated Oct. 15, 2010 in U.S. Appl. No. 11/779,737.
USPTO; Advisory Action dated Jul. 11, 2011 in U.S. Appl. No. 12/857,389.
USPTO; Advisory Action dated Jul. 11, 2011 in U.S. Appl. No. 12/857,424.
PCT; International Search Report and Written Opinion dated Nov. 27, 2011 in Application No. PCT/US2011/047012.
USPTO; Office Action dated Nov. 10, 2011 in U.S. Appl. No. 13/153,890.
USPTO; Final Office Action dated Apr. 5, 2012 in U.S. Appl. No. 13/153,890.
USPTO; Office Action dated Nov. 15, 2012 in U.S. Appl. No. 13/443,100.
USPTO; Advisory Action dated Nov. 23, 2012 in U.S. Appl. No. 13/466,412.
International Preliminary Report on Patentability dated Dec. 7, 2012 in Application No. PCT/US2011/047012.
USPTO; Office Action dated Aug. 3, 2012 in U.S. Appl. No. 13/466,412.
USPTO; Office Action dated Aug. 17, 2012 in U.S. Appl. No. 13/466,445.
USPTO; Office Action dated Aug. 30, 2012 in U.S. Appl. No. 13/188,693.
USPTO; Office Action dated Aug. 30, 2012 in U.S. Appl. No. 13/468,880.
USPTO; Office Action dated Sep. 6, 2012 in U.S. Appl. No. 13/467,503.
USPTO; Office Action dated Sep. 17, 2012 in U.S. Appl. No. 13/021,237.
USPTO; Office Action dated Oct. 9, 2012 in U.S. Appl. No. 13/468,931.
USPTO; Office Action dated Oct. 9, 2012 in U.S. Appl. No. 13/477,806.
USPTO; Office Action dated Oct. 12, 2012 in U.S. Appl. No. 13/439,768.
USPTO; Final Office Action dated Oct. 12, 2012 in U.S. Appl. No. 13/466,412.
USPTO; Office Action dated Oct. 15, 2012 in U.S. Appl. No. 13/594,528.
USPTO; Office Action dated Oct. 18, 2012 in U.S. Appl. No. 13/593,204.
USPTO; Office Action dated Oct. 19, 2012 in U.S. Appl. No. 13/411,281.
Dan Oshinsky, "Jet Blue's $1 Million Twitter Hashtag," Aug. 18, 2010, 4 pages, retrieved from: http://danoshinsky.com/2010/08/18/a-social-media-case-study-jetblue-vs-sun-country/.
www.americanexpress.com/gift/faq from Feb. 25, 2005, 2 pages.
USPTO; Advisory Action dated Mar. 15, 2013 in U.S. Appl. No. 13/593,204.
USPTO; Advisory Action dated May 22, 2013 in U.S. Appl. No. 13/188,693.
USPTO; Advisory Action dated Mar. 19, 2013 in U.S. Appl. No. 13/021,237.
USPTO; Advisory Action dated Mar. 19, 2013 in U.S. Appl. No. 13/468,931.
International Search Report and Written Opinion dated Mar. 22, 2013 in Application No. PCT/2013/028209.
USPTO; Advisory Action dated Mar. 28, 2013 in U.S. Appl. No. 13/411,281.
USPTO; Office Action dated Apr. 11, 2013 in U.S. Appl. No. 12/857,424.
USPTO; Advisory Action dated Mar. 18, 2013 in U.S. Appl. No. 13/467,503.
USPTO; Final Office Action dated May 2, 2013 in U.S. Appl. No. 13/468,880.
International Preliminary Report on Patentability dated May 7, 2013 in Application No. PCT/US2012/021648.
USPTO; Advisory Action dated May 10, 2013 in U.S. Appl. No. 13/477,806.
USPTO; Office Action dated May 23, 2013 in U.S. Appl. No. 13/734,693.
International Preliminary Report on Patentability dated on May 23, 2013 in Application No. PCT/US2012/027810.
USPTO; Advisory Action dated Jun. 6, 2013 in U.S. Appl. No. 13/466,445.
International Preliminary Report on Patentability dated on Jun. 28, 2013 in Application No. PCT/US2012/027664.
USPTO; Office Action dated Jul. 19, 2013 in U.S. Appl. No. 13/715,423.
USPTO; Office Action dated Aug. 14, 2013 in U.S. Appl. No. 11/779,734.
USPTO; Final Office Action dated Aug. 14, 2013 in U.S. Appl. No. 12/857,424.
USPTO; Office Action dated Aug. 26, 2013 in U.S. Appl. No. 13/889,305.
USPTO; Office Action dated Aug. 27, 2013 in U.S. Appl. No. 13/889,285.
USPTO; Final Office Action dated Aug. 28, 2013 in U.S. Appl. No. 13/443,100.
USPTO; Final Office Action dated Jan. 4, 2013 in U.S. Appl. No. 13/593,204.
USPTO; Final Office Action dated Jan. 7, 2013 in U.S. Appl. No. 13/467,503.
USPTO; Final Office Action dated Jan. 7, 2013 in U.S. Appl. No. 13/466,445.
USPTO; Final Office Action dated Jan. 10, 2013 in U.S. Appl. No. 13/468,931.
USPTO; Final Office Action dated Mar. 6, 2013 in U.S. Appl. No. 13/188,693.
USPTO; Final Office Action dated Jan. 31, 2013 in U.S. Appl. No. 13/411,281.
USPTO; Final Office Action dated Feb. 14, 2013 in U.S. Appl. No. 13/021,237.
USPTO; Final Office Action dated Feb. 25, 2013 in U.S. Appl. No. 13/477,806.
USPTO; Final Office Action dated Mar. 1, 2013 in U.S. Appl. No. 13/439,768.
USPTO; Final Office Action dated Mar. 4, 2013 in U.S. Appl. No. 13/594,528.
USPTO; Office Action dated Sep. 23, 2013 in U.S. Appl. No. 13/889,307.
USPTO; Advisory Action dated Oct. 4, 2013 in U.S. Appl. No. 13/468,880.
USPTO; Advisory Action dated Oct. 7, 2013 in U.S. Appl. No. 12/857,424.
USPTO; Final Office Action dated Oct. 30, 2013 in U.S. Appl. No. 11/779,734.
USPTO; Restriction Requirement dated Oct. 30, 2013 in U.S. Appl. No. 13/889,288.
USPTO; Final Office Action dated Oct. 31, 2013 in U.S. Appl. No. 13/889,305.
USPTO; Advisory Action dated Nov. 5, 2013 in U.S. Appl. No. 13/443,100.
USPTO; Final Office Action dated Nov. 5, 2013 in U.S. Appl. No. 13/889,285.
USPTO; Office Action dated Nov. 6, 2013 in U.S. Appl. No. 13/889,272.
USPTO; Office Action dated Nov. 22, 2013 in U.S. Appl. No. 13/889,299.
USPTO; Final Office Action dated Nov. 26, 2013 in U.S. Appl. No. 13/734,693.
USPTO; Notice of Allowance dated Dec. 17, 2013 in U.S. Appl. No. 13/594,528.
USPTO; Office Action dated Jan. 3, 2014 in U.S. Appl. No. 13/889,288.
USPTO; Advisory Action dated Jan. 14, 2014 in U.S. Appl. No. 13/889,285.
USPTO; Office Action dated Jan. 15, 2014 in U.S. Appl. No. 13/411,281.

(56) References Cited

OTHER PUBLICATIONS

USPTO; Final Office Action dated Jan. 29, 2014 in U.S. Appl. No. 13/889,307.
K-means++ Wikipedia Page, pp. 1-4, page last modified on Nov. 18, 2013, http://en.wikipedia.org/wiki/K-means++ retrieved from the web Nov. 21, 2013.
USPTO; Office Action dated Feb. 3, 2014 in U.S. Appl. No. 13/593,204.
International Preliminary Report on Patentability dated on Feb. 3, 2014 in Application No. PCT/US2013/028209.
USPTO; Advisory Action dated Feb. 5, 2014 in U.S. Appl. No. 13/734,693.
USPTO; Final Office Action dated Feb. 11, 2014 in U.S. Appl. No. 13/715,423.
USPTO; Office Action dated Feb. 12, 2014 in U.S. Appl. No. 13/468,931.
Golson, "Major League Baseball Rolling out Thousands of iBeacons for Opening Day," Jan. 30, 2014, pp. 2-3, retrieved from http://www.macrumors.com/2014/01/30/mlb-ibeacon-rollout/ on Feb. 12, 2014.
D Arthur, S Vassilvitskii , "k-means++: The advantages of careful seeding", Proceedings of the eighteenth annual ACM-SIAM symposium on Discrete algorithms, pp. 1027-1035, 2007, dl.acm.org.
AK Jain, "Data clustering: 50 years beyond K-means", Pattern Recognition Letters, 2010, pp. 1-33, Elsevier.
USPTO; Final Office Action dated Jan. 28, 2015 in U.S. Appl. No. 13/889,307.
USPTO; Final Office Action dated Jan. 30, 2015 in U.S. Appl. No. 13/794,301.
USPTO; Final Office Action dated Feb. 11, 2015 in U.S. Appl. No. 14/065,883.
USPTO; Final Office Action dated Feb. 13, 2015 in U.S. Appl. No. 13/794,334.
USPTO; Final Office Action dated Feb. 26, 2015 in U.S. Appl. No. 13/941,306.
USPTO; Office Action dated Feb. 27, 2015 in U.S. Appl. No. 13/443,100.
USPTO; Office Action dated Mar. 2, 2015 in U.S. Appl. No. 13/686,608.
USPTO; Final Office Action dated Mar. 13, 2015 in U.S. Appl. No. 13/794,374.
USPTO; Final Office Action dated Mar. 23, 2015 in U.S. Appl. No. 13/926,789.
Search Report and Written Opinion dated Feb. 16, 2015 in Singapore Application No. 11201400788P.
USPTO; Advisory Action dated Jul. 30, 2014 in U.S. Appl. No. 13/593,204.
USPTO; Advisory Action dated Jul. 30, 2014 in U.S. Appl. No. 13/411,281.
USPTO; Office Action dated Jul. 30, 2014 in U.S. Appl. No. 13/794,301.
USPTO; Advisory Action dated Sep. 3, 2014 in U.S. Appl. No. 13/467,503.
USPTO; Advisory Action dated Aug. 7, 2014 in U.S. Appl. No. 13/468,931.
Examination Report dated Aug. 11, 2014 in New Zealand Application No. 623019.
USPTO; Final Office Action dated Aug. 13, 2014 in U.S. Appl. No. 13/153,890.
USPTO; Office Action dated Aug. 14, 2014 in U.S. Appl. No. 13/794,145.
USPTO; Office Action dated Aug. 14, 2014 in U.S. Appl. No. 13/794,334.
USPTO; Office Action dated Aug. 15, 2014 in U.S. Appl. No. 13/794,374.
USPTO; Advisory Action dated Sep. 2, 2014 in U.S. Appl. No. 13/466,445.
USPTO; Advisory Action dated Sep. 3, 2014 in U.S. Appl. No. 12/857,389.
USPTO; Advisory Action dated Sep. 3, 2014 in U.S. Appl. No. 13/466,412.
USPTO; Advisory Action dated Sep. 3, 2014 in U.S. Appl. No. 13/021,237.
USPTO; Advisory Action dated Sep. 5, 2014 in U.S. Appl. No. 13/889,305.
USPTO; Office Action dated Sep. 17, 2014 in U.S. Appl. No. 13/794,226.
USPTO; Office Action dated Sep. 26, 2014 in U.S. Appl. No. 13/477,806.
USPTO; Office Action dated Oct. 3, 2014 in U.S. Appl. No. 12/857,424.
USPTO; Office Action dated Oct. 8, 2014 in U.S. Appl. No. 13/734,693.
USPTO; Office Action dated Oct. 9, 2014 in U.S. Appl. No. 13/926,789.
USPTO; Office Action dated Oct. 17, 2014 in U.S. Appl. No. 11/779,734.
USPTO; Office Action dated Oct. 17, 2014 in U.S. Appl. No. 14/065,883.
USPTO; Office Action dated Oct. 20, 2014 in U.S. Appl. No. 13/941,306.
USPTO; Office Action dated May 7, 2014 in U.S. Appl. No. 13/477,806.
USPTO; Advisory Action dated Jul. 8, 2014 in U.S. Appl. No. 13/889,299.
USPTO; Final Office Action dated May 20, 2014 in U.S. Appl. No. 13/593,204.
USPTO; Notice of Allowance dated May 22, 2014 in U.S. Appl. No. 13/245,636.
USPTO; Final Office Action dated May 29, 2014 in U.S. Appl. No. 13/468,931.
USPTO; Advisory Action dated Jun. 2, 2014 in U.S. Appl. No. 13/889,272.
USPTO; Office Action dated Jun. 5, 2014 in U.S. Appl. No. 11/779,734.
USPTO; Office Action dated Jun. 11, 2014 in U.S. Appl. No. 13/188,693.
USPTO; Final Office Action dated Jun. 16, 2014 in U.S. Appl. No. 13/467,503.
USPTO; Final Office Action dated Jun. 16, 2014 in U.S. Appl. No. 12/857,389.
USPTO; Final Office Action dated Jun. 16, 2014 in U.S. Appl. No. 13/466,412.
USPTO; Final Office Action dated Jun. 16, 2014 in U.S. Appl. No. 13/466,445.
USPTO; Office Action dated Jun. 24, 2014 in U.S. Appl. No. 13/468,880.
USPTO; Final Office Action dated Jun. 30, 2014 in U.S. Appl. No. 13/021,237.
USPTO; Final Office Action dated Jun. 30, 2014 in U.S. Appl. No. 13/889,305.
USPTO; Notice of Allowance dated Jul. 2, 2014 in U.S. Appl. No. 13/889,285.
USPTO; Advisory Action dated Jul. 2, 2014 in U.S. Appl. No. 13/889,288.
USPTO; Office Action dated Jul. 3, 2014 in U.S. Appl. No. 13/889,307.
USPTO; Office Action dated Feb. 5, 2014 in U.S. Appl. No. 13/245,636.
USPTO; Office Action dated Oct. 11, 2013 in U.S. Appl. No. 13/245,636.
International Preliminary Report on Patentability dated on Aug. 22, 2013 in Application No. PCT/US2012/056231.
International Search Report and Written Opinion dated Dec. 7, 2012 in Application No. PCT/2012/056231.
USPTO; Office Action dated Oct. 23, 2014 in U.S. Appl. No. 13/715,770.
USPTO; Advisory Action dated Oct. 24, 2014 in U.S. Appl. No. 13/153,890.
USPTO; Office Action dated Oct. 29, 2014 in U.S. Appl. No. 13/926,884.

(56) References Cited

OTHER PUBLICATIONS

USPTO; Office Action dated Oct. 29, 2014 in U.S. Appl. No. 13/926,895.
USPTO; Office Action dated Nov. 7, 2014 in U.S. Appl. No. 13/715,792.
USPTO; Office Action dated Nov. 7, 2014 in U.S. Appl. No. 13/715,423.
USPTO; Office Action dated Dec. 29, 2014 in U.S. Appl. No. 13/188,693.
USPTO; Office Action dated Jan. 9, 2015 in U.S. Appl. No. 13/468,880.
USPTO; Office Action dated Jan. 16, 2015 in U.S. Appl. No. 13/889,299.
Lee et al., "iJADE eMiner—A Web Based Mining Agent Based on Intelligent Java Agent Development Environment (iJADE) on Internet Shopping," Advances in Knowledge Discovery and Data Mining, 2001, Springer-Verlag, pp. 28-40.
USPTO; Final Office Action dated Mar. 25, 2015 in U.S. Appl. No. 13/477,806.
USPTO; Final Office Action dated Mar. 25, 2015 in U.S. Appl. No. 13/794,226.
USPTO; Office Action dated Mar. 27, 2015 in U.S. Appl. No. 13/466,445.
USPTO; Final Office Action dated Apr. 3, 2015 in U.S. Appl. No. 13/926,884.
USPTO; Final Office Action dated Apr. 3, 2015 in U.S. Appl. No. 13/715,770.
USPTO; Final Office Action dated Apr. 7, 2015 in U.S. Appl. No. 13/926,895.
USPTO; Advisory Action dated Apr. 8, 2015 in U.S. Appl. No. 13/794,301.
USPTO; Office Action dated Apr. 8, 2015 in U.S. Appl. No. 13/021,237.
USPTO; Final Office Action dated Apr. 8, 2015 in U.S. Appl. No. 13/794,145.
USPTO; Final Office Action dated Apr. 13, 2015 in U.S. Appl. No. 13/734,693.
USPTO; Advisory Action dated Apr. 17, 2015 in U.S. Appl. No. 13/889,307.
USPTO; Final Office Action dated Apr. 17, 2015 in U.S. Appl. No. 13/715,792.
USPTO; Advisory Action dated Apr. 23, 2015 in U.S. Appl. No. 13/794,334.
USPTO; Advisory Action dated Apr. 23, 2015 in U.S. Appl. No. 14/065,883.
USPTO; Final Office Action dated Apr. 30, 2015 in U.S. Appl. No. 12/857,424.
Tang, "Approac to detection of community's consensus and interest," Institute of Systems Science, 2008, Springer-Verlag, pp. 17-29.
USPTO; Advisory Action dated 005/082015 in U.S. Appl. No. 13/941,306.
USPTO; Final Office Action dated May 13, 2015 in U.S. Appl. No. 11/779,734.
USPTO; Office Action dated May 28, 2015 in U.S. Appl. No. 13/467,503.
Aimeur et al., "Alambic: a privacy-preserving recommender system for electronic commerce," Feb. 27, 2008, Springer-Verlag, pp. 307-334.
USPTO; Advisory Action dated Jun. 3, 2015 in U.S. Appl. No. 13/794,226.
USPTO; Advisory Action dated Jun. 3, 2015 in U.S. Appl. No. 13/794,374.
USPTO; Advisory Action dated Jun. 10, 2015 in U.S. Appl. No. 13/477,806.
USPTO; Advisory Action dated Jun. 11, 2015 in U.S. Appl. No. 13/926,789.
Burke, "Hybrid Recommender Systems: Survey and Experiments," User modeling and user-adapted interaction, 2002, Kluwer Academic Publishers, pp. 331-370.
USPTO; Advisory Action dated Jun. 15, 2015 in U.S. Appl. No. 13/715,770.
USPTO; Office Action dated Jun. 19, 2015 in U.S. Appl. No. 13/794,301.
USPTO; Office Action dated Jun. 25, 2015 in U.S. Appl. No. 13/889,307.
USPTO; Advisory Action dated Jun. 25, 2015 in U.S. Appl. No. 13/734,693.
USPTO; Advisory Action dated Jun. 26, 2015 in U.S. Appl. No. 13/794,145.
USPTO; Advisory Action dated Jun. 29, 2015 in U.S. Appl. No. 13/715,792.
USPTO; Office Action dated Jul. 10, 2015 in U.S. Appl. No. 13/794,374.
USPTO; Advisory Action dated Jul. 10, 2015 in U.S. Appl. No. 12/857,424.
USPTO; Office Action dated Jul. 10, 2015 in U.S. Appl. No. 13/411,281.
USPTO; Final Office Action dated Jul. 17, 2015 in U.S. Appl. No. 13/188,693.
USPTO; Final Office Action dated Jul. 20, 2015 in U.S. Appl. No. 13/686,608.
USPTO; Advisory Action dated Jul. 21, 2015 in U.S. Appl. No. 11/779,734.
USPTO; Final Office Action dated Jul. 23, 2015 in U.S. Appl. No. 13/466,445.
USPTO; Office Action dated Aug. 4, 2015 in U.S. Appl. No. 13/794,334.
USPTO; Office Action dated Aug. 5, 2015 in U.S. Appl. No. 13/926,789.
USPTO; Final Office Action dated Aug. 5, 2015 in U.S. Appl. No. 13/021,237.
USPTO; Final Office Action dated Aug. 7, 2015 in U.S. Appl. No. 13/889,299.
USPTO; Office Action dated Aug. 11, 2015 in U.S. Appl. No. 13/926,895.
USPTO; Final Office Action dated Aug. 12, 2015 in U.S. Appl. No. 13/468,880.
USPTO; Office Action dated Aug. 17, 2015 in U.S. Appl. No. 14/065,883.
USPTO; Office Action dated Aug. 17, 2015 in U.S. Appl. No. 13/439,768.
USPTO; Office Action dated Aug. 19, 2015 in U.S. Appl. No. 13/926,884.
USPTO; Office Action dated Aug. 28, 2015 in U.S. Appl. No. 13/794,272.
Examination Report dated Mar. 24, 2015 in Australian Application No. 2012316453.
Notice of Acceptance dated May 8, 2015 in New Zealand Application No. 623019.
USPTO; Office Action dated Jun. 3, 2016 in U.S. Appl. No. 14/065,883.
USPTO; Office Action dated Jun. 3, 2016 in U.S. Appl. No. 12/857,424.
USPTO; Notice of Allowance dated Jun. 3, 2016 in U.S. Appl. No. 13/593,204.
USPTO; Final Office Action dated Jun. 8, 2016 in U.S. Appl. No. 12/857,389.
USPTO; Office Action dated Jun. 9, 2016 in U.S. Appl. No. 13/926,895.
USPTO; Final Office Action dated Jun. 10, 2016 in U.S. Appl. No. 13/466,412.
USPTO; Final Office Action dated Jun. 13, 2016 in U.S. Appl. No. 13/468,931.
USPTO; Final Office Action dated Jun. 15, 2016 in U.S. Appl. No. 13/686,608.
USPTO; Office Action dated Jun. 17, 2016 in U.S. Appl. No. 13/468,880.
USPTO; Office Action dated Jun. 17, 2016 in U.S. Appl. No. 13/941,306.
USPTO; Final Office Action dated Jun. 17, 2016 in U.S. Appl. No. 13/794,145.

(56) References Cited

OTHER PUBLICATIONS

USPTO; Advisory Action dated Jun. 24, 2016 in U.S. Appl. No. 13/715,770.
USPTO; Final Office Action dated Jul. 1, 2016 in U.S. Appl. No. 13/794,226.
USPTO; Final Office Action dated Jul. 5, 2016 in U.S. Appl. No. 13/889,305.
USPTO; Advisory Action dated Jul. 6, 2016 in U.S. Appl. No. 13/468,931.
USPTO; Office Action dated Jul. 7, 2016 in U.S. Appl. No. 14/284,817.
USPTO; Notice of Allowance dated Jul. 13, 2016 in U.S. Appl. No. 11/779,734.
USPTO; Final Office Action dated Jul. 28, 2016 in U.S. Appl. No. 13/889,272.
USPTO; Final Office Action dated Aug. 12, 2016 in U.S. Appl. No. 13/889,299.
"What is a token in programming?" Quora, pp. 1-3, retrieved from https://www.quora.com/What-is-a-token-in-programming on May 31, 2016.
USPTO; Office Action dated Dec. 4, 2015 in U.S. Appl. No. 13/794,145.
USPTO; Office Action dated Dec. 17, 2015 in U.S. Appl. No. 13/715,770.
USPTO; Office Action dated Dec. 31, 2015 in U.S. Appl. No. 13/734,693.
USPTO; Final Office Action dated Dec. 30, 2015 in U.S. Appl. No. 14/065,883.
USPTO; Advisory Action dated Jan. 6, 2016 in U.S. Appl. No. 13/443,100.
USPTO; Final Office Action dated Jan. 11, 2016 in U.S. Appl. No. 13/411,281.
USPTO; Advisory Action dated Nov. 17, 2015 in U.S. Appl. No. 13/468,880.
USPTO; Office Action dated Jan. 14, 2016 in U.S. Appl. No. 13/889,272.
USPTO; Final Office Action dated Jan. 14, 2016 in U.S. Appl. No. 13/794,301.
USPTO; Office Action dated Jan. 15, 2016 in U.S. Appl. No. 13/889,299.
USPTO; Final Office Action dated Oct. 26, 2015 in U.S. Appl. No. 13/467,503.
USPTO; Office Action dated Jan. 20, 2016 in U.S. Appl. No. 13/889,307.
Pashtan, et al, "Personal Service Areas for Mobile Web Applications," IEEE Internet Computing, 2004, ieeexplore.ieee.org, 7 pages.
Pandey, et al., "Exploiting User Profiles to Support Differentiated Services in Next-Generation Wireless Networks," Network, IEEE, 2004, ieeexplore.ieee.org, 23 pages.
Liapis, et al., Implementing a Low-Cost, Personalized and Location Based Service for Delivering Advertisements to Mobile Users, Athens Information Technology, Oct. 2008, ieeexplore.ieee.org, 49 pages.
Park, et al, "Location-Based Recommendation System using Bayesian User's Preference Model in Mobile Devices," Ubiquitous Intelligence and Computing, 2007, Springer-Verlag Berlin Heidelberg, 10 pages.
Office Action dated Oct. 26, 2015 in Canadian Application No. 2,863,576.
Notice of Acceptance dated Nov. 30, 2015 in Australian Application No. 2012316453.
Office Action dated Dec. 10, 2015 in Canadian Application No. 2,849,271.
Written Opinion dated Aug. 5, 2015 in Singapore Application No. 11201400788P.
USPTO; Advisory Action dated Sep. 29, 2015 in U.S. Appl. No. 13/686,608.
USPTO; Notice of Allowance dated Sep. 29, 2015 in U.S. Appl. No. 13/715,792.
USPTO; Office Action dated Oct. 8, 2015 in U.S. Appl. No. 13/941,306.
USPTO; Advisory Action dated Oct. 13, 2015 in U.S. Appl. No. 13/021,237.
USPTO; Advisory Action dated Oct. 16, 2015 in U.S. Appl. No. 13/466,445.
USPTO; Final Office Action dated Oct. 16, 2015 in U.S. Appl. No. 13/443,100.
USPTO; Advisory Action dated Oct. 22, 2015 in U.S. Appl. No. 13/188,693.
USPTO; Advisory Action dated Jan. 11, 2016 in U.S. Appl. No. 13/467,503.
USPTO; Advisory Action dated Nov. 17, 2015 in U.S. Appl. No. 13/889,299.
IP Australia; Examination Report dated Aug. 3, 2016 in Australian Application No. 2015201925.
USPTO; Advisory Action dated Aug. 17, 2016 in U.S. Appl. No. 12/857,389.
CIPO; Notice of Allowance dated Aug. 18, 2016 in Canadian Application No. 2,863,576.
USPTO; Advisory Action dated Aug. 18, 2016 in U.S. Appl. No. 13/466,412.
USPTO; Notice of Allowance dated Aug. 24, 2016 in U.S. Appl. No. 13/021,237.
USPTO; Advisory Action dated Aug. 24, 2016 in U.S. Appl. No. 13/686,608.
USPTO; Office Action dated Aug. 24, 2016 in U.S. Appl. No. 13/794,334.
USPTO; Final Office Action dated Aug. 25, 2016 in U.S. Appl. No. 13/466,445.
USPTO; Advisory Action dated Aug. 25, 2016 in U.S. Appl. No. 13/794,145.
USPTO; Final Office Action dated Aug. 26, 2016 in U.S. Appl. No. 13/443,100.
USPTO; Final Office Action dated Aug. 30, 2016 in U.S. Appl. No. 13/889,307.
USPTO; Office Action dated Sep. 2, 2016 in U.S. Appl. No. 13/467,503.
USPTO; Final Office Action dated Sep. 2, 2016 in U.S. Appl. No. 12/857,424.
USPTO; Final Office Action dated Sep. 7, 2016 in U.S. Appl. No. 13/153,890.
USPTO; Notice of Allowance dated Sep. 9, 2016 in U.S. Appl. No. 13/926,789.
USPTO; Advisory Action dated Sep. 12, 2016 in U.S. Appl. No. 13/889,305.
USPTO; Final Office Action dated Sep. 14, 2016 in U.S. Appl. No. 13/477,806.
USPTO; Advisory Action dated Sep. 21, 2016 in U.S. Appl. No. 13/889,272.
USPTO; Final Office Action dated Sep. 22, 2016 in U.S. Appl. No. 13/889,288.
USPTO; Advisory Action dated Sep. 22, 2016 in U.S. Appl. No. 13/794,226.
USPTO; Final Office Action dated Sep. 23, 2016 in U.S. Appl. No. 14/065,883.
USPTO; Office Action dated Sep. 29, 2016 in U.S. Appl. No. 12/857,389.
USPTO; Office Action dated Sep. 29, 2016 in U.S. Appl. No. 13/466,412.
USPTO; Final Office Action dated Sep. 30, 2016 in U.S. Appl. No. 13/941,306.
USPTO; Office Action dated Oct. 7, 2016 in U.S. Appl. No. 13/715,770.
USPTO; Notice of Allowance dated Oct. 11, 2016 in U.S. Appl. No. 13/926,884.
USPTO; Office Action dated Oct. 11, 2016 in U.S. Appl. No. 13/794,145.
USPTO; Office Action dated Oct. 11, 2016 in U.S. Appl. No. 13/794,226.
USPTO; Office Action dated Oct. 11, 2016 in U.S. Appl. No. 13/794,301.

(56) References Cited

OTHER PUBLICATIONS

USPTO; Advisory Action dated Oct. 20, 2016 in U.S. Appl. No. 13/889,307.
USPTO; Advisory Action dated Oct. 27, 2016 in U.S. Appl. No. 12/857,424.
USPTO; Office Action dated Feb. 1, 2016 in U.S. Appl. No. 13/443,100.
USPTO; Final Office Action dated Feb. 2, 2016 in U.S. Appl. No. 13/926,789.
USPTO; Final Office Action dated Feb. 2, 2016 in U.S. Appl. No. 13/941,306.
USPTO; Final Office Action dated Feb. 9, 2016 in U.S. Appl. No. 13/794,374.
USPTO; Final Office Action dated Feb. 9, 2016 in U.S. Appl. No. 13/794,272.
USPTO; Final Office Action dated Feb. 11, 2016 in U.S. Appl. No. 13/794,334.
USPTO; Final Office Action dated Feb. 11, 2016 in U.S. Appl. No. 13/926,884.
USPTO; Final Office Action dated Feb. 12, 2016 in U.S. Appl. No. 13/926,895.
USPTO; Office Action dated Feb. 12, 2016 in U.S. Appl. No. 13/593,204.
USPTO; Office Action dated Feb. 19, 2016 in U.S. Appl. No. 13/468,931.
Office Action dated Feb. 29, 2016 in Canadian Application No. 2,874,582.
USPTO; Office Action dated Feb. 29, 2016 in U.S. Appl. No. 13/686,608.
USPTO; Office Action dated Mar. 4, 2016 in U.S. Appl. No. 13/466,412.
USPTO; Office Action dated Mar. 4, 2016 in U.S. Appl. No. 13/794,226.
USPTO; Office Action dated Mar. 7, 2016 in U.S. Appl. No. 12/857,389.
USPTO; Office Action dated Mar. 17, 2016 in U.S. Appl. No. 13/889,305.
USPTO; Advisory Action dated Mar. 18, 2016 in U.S. Appl. No. 13/439,768.
USPTO; Advisory Action dated Mar. 18, 2016 in U.S. Appl. No. 13/411,281.
USPTO; Advisory Action dated Mar. 25, 2016 in U.S. Appl. No. 13/794,301.
USPTO; Advisory Action dated Mar. 28, 2016 in U.S. Appl. No. 14/065,883.
White, "Deals as Debit Rewards? Bank of America Brings Back Debit Card Rewards With a Twist," Jan. 25, 2012, 2 pages, retrieved from http://moneyland.time.com/2012/01/25/deals-as-debit-rewards-bank-of-america-brings-back-debit-card-rewards-with-a-twist/.
Owen, et al., "Improving the Value and Performance of Online Offers," A First Data White Paper, First Data Corporation, 2012, 10 pages.
Noyes, "Card-Linked Offers Update," Transaction World Magazine, Jul. 2012, 2 pages.
Examination Report dated Feb. 26, 2016 in Australian Application No. 2015201925.
USPTO; Office Action dated Mar. 31, 2016 in U.S. Appl. No. 13/889,288.
USPTO; Final Office Action dated Apr. 14, 2016 in U.S. Appl. No. 13/715,770.
USPTO; Office Action dated Apr. 15, 2016 in U.S. Appl. No. 13/188,693.
USPTO; Advisory Action dated Apr. 15, 2016 in U.S. Appl. No. 13/926,789.
USPTO; Notice of Allowance dated Apr. 18, 2016 in U.S. Appl. No. 13/734,693.
USPTO; Advisory Action dated Apr. 21, 2016 in U.S. Appl. No. 13/794,272.
USPTO; Advisory Action dated Apr. 22, 2016 in U.S. Appl. No. 13/794,374.
Office Action dated Apr. 25, 2016 in Canadian Application No. 2,888,085.
USPTO; Advisory Action dated May 2, 2016 in U.S. Appl. No. 13/926,884.
USPTO; Advisory Action dated May 2, 2016 in U.S. Appl. No. 13/794,334.
USPTO; Office Action dated May 16, 2016 in U.S. Appl. No. 13/153,890.
USPTO; Office Action dated May 26, 2016 in U.S. Appl. No. 13/477,806.
USPTO; Office Action dated May 19, 2016 in U.S. Appl. No. 13/926,895.
USPTO; Notice of Allowance dated May 25, 2016 in U.S. Appl. No. 13/439,768.
Pang, et al., "Opinion mining and sentiment analysis", Foundations and trends in information retrieval, vol. 2, No. 1-2 (2008) 1-135.
Pavlovic, "Dynamics, robustness and fragility of trust", Formal Aspects in Security and Trust, 2009—Springer.
Resnick, et al., "Recommender Systems", Mar. 1997, Communications of the ACM, vol. 40,No. 3, pp. 56-58.
Ricci, et al.; "Recommendation and Personalization in eCommerce", Proceedings of the AH'2002 Workshop on Recommendation and Personalization in eCommerce, Malaga, Spain, May 28, 2002, pp. 1-160.
Ghose, et al., "Opinion Mining using Econometrics: A case study on Reputation Systems", Department of Information, Operations, and Management Sciences, Annual Meeting, 2007.
USPTO; Advisory Action dated Oct. 31, 2016 in U.S. Appl. No. 13/889,288.
USPTO; Advisory Action dated Nov. 1, 2016 in U.S. Appl. No. 13/153,890.
USPTO; Final Office Action dated Nov. 1, 2016 in U.S. Appl. No. 13/926,895.
USPTO; Notice of Allowance dated Nov. 2, 2016 in U.S. Appl. No. 13/477,806.
USPTO; Advisory Action dated Nov. 3, 2016 in U.S. Appl. No. 14/065,883.
USPTO; Advisory Action dated Nov. 4, 2016 in U.S. Appl. No. 13/443,100.
USPTO; Final Office Action dated Nov. 4, 2016 in U.S. Appl. No. 13/794,334.
USPTO; Advisory Action dated Dec. 8, 2016 in U.S. Appl. No. 13/926,895.
USPTO; Final Office Action dated Nov. 10, 2016 in U.S. Appl. No. 14/284,817.
USPTO; Advisory Action dated Nov. 15, 2016 in U.S. Appl. No. 13/889,299.
USPTO; Advisory Action dated Nov. 16, 2016 in U.S. Appl. No. 13/941,306.
USPTO; Notice of Allowance dated Nov. 17, 2016 in U.S. Appl. No. 12/857,424.
USPTO; Final Office Action dated Nov. 17, 2016 in U.S. Appl. No. 13/188,693.
USPTO; Notice of Allowance dated Nov. 18, 2016 in U.S. Appl. No. 13/468,931.
USPTO; Office Action dated Nov. 18, 2016 in U.S. Appl. No. 13/443,100.
USPTO; Office Action dated Nov. 28, 2016 in U.S. Appl. No. 14/065,883.
USPTO; Office Action dated Dec. 2, 2016 in U.S. Appl. No. 13/153,890.
USPTO; Office Action dated Dec. 14, 2016 in U.S. Appl. No. 13/941,306.
USPTO; Advisory Action dated Dec. 14, 2016 in U.S. Appl. No. 13/794,334.
USPTO; Final Office Action dated Dec. 15, 2016 in U.S. Appl. No. 13/468,880.
USPTO; Office Action dated Dec. 15, 2016 in U.S. Appl. No. 13/411,281.
USPTO; Office Action dated Dec. 20, 2016 in U.S. Appl. No. 13/889,305.

(56) References Cited

OTHER PUBLICATIONS

USPTO; Office Action dated Jan. 4, 2017 in U.S. Appl. No. 13/794,334.
USPTO; Office Action dated Jan. 13, 2017 in U.S. Appl. No. 13/794,374.
Supplementary Examination Report dated Oct. 17, 2016 in New Zealand Application No. 11201400788P.
Notice of Eligibility for Grant dated Nov. 1, 2016 in Singapore Application No. 11201400788P.
Examination Report dated Nov. 22, 2016 in Australian Application No. 2015201925.
Examination Report dated Jan. 11, 2017 in Australian Application No. 2016201509.
Examination Report dated Jan. 23, 2017 in Australian Application No. 2015201925.
Examination Report dated Feb. 24, 2017 in Australian Application No. 2015201925.
Pocket-lint, Apple's iBeacons explained: What it is and why it matters, retrieved from internet on Feb. 21, 2017, http://web.archive.org/web/20130925141212/http://www.pocket-lint.com/news/123730-apple-sibeacons-explained-what-it-is-and-why-it-matters> published on Sep. 25, 2013 as per Wayback Machine, 10 pages.
USPTO; Office Action dated Feb. 26, 2014 in U.S. Appl. No. 13/467,503.
USPTO; Office Action dated Feb. 26, 2014 in U.S. Appl. No. 12/857,389.
USPTO; Office Action dated Feb. 26, 2014 in U.S. Appl. No. 13/466,412.
USPTO; Office Action dated Feb. 26, 2014 in U.S. Appl. No. 13/021,237.
USPTO; Office Action dated Feb. 26, 2014 in U.S. Appl. No. 13/466,445.
USPTO; Office Action dated Feb. 26, 2014 in U.S. Appl. No. 13/889,305.
USPTO; Office Action dated Mar. 7, 2014 in U.S. Appl. No. 13/889,285.
USPTO; Office Action dated Mar. 11, 2014 in U.S. Appl. No. 13/153,890.
USPTO; Final Office Action dated Mar. 13, 2014 in U.S. Appl. No. 13/889,272.
USPTO; Final Office Action dated Apr. 25, 2014 in U.S. Appl. No. 13/889,299.
USPTO; Final Office Action dated Apr. 28, 2014 in U.S. Appl. No. 13/889,288.
USPTO; Advisory Action dated Apr. 30, 2014 in U.S. Appl. No. 13/715,423.
USPTO; Final Office Action dated May 5, 2014 in U.S. Appl. No. 13/411,281.
USPTO; Final Office Action dated Jan. 19, 2017 in U.S. Appl. No. 13/466,445.
USPTO; Final Office Action dated Jan. 20, 2017 in U.S. Appl. No. 13/467,503.
USPTO; Office Action dated Jan. 23, 2017 in U.S. Appl. No. 14/464,439.
USPTO; Advisory Action dated Jan. 25, 2017 in U.S. Appl. No. 14/284,817.
USPTO; Office Action dated Jan. 30, 2017 in U.S. Appl. No. 14/464,474.
USPTO; Notice of Allowance dated Feb. 2, 2017 in U.S. Appl. No. 12/857,389.
USPTO; Advisory Action dated Feb. 7, 2017 in U.S. Appl. No. 13/188,693.
USPTO; Final Office Action dated Feb. 8, 2017 in U.S. Appl. No. 13/715,770.
USPTO; Final Office Action dated Feb. 9, 2017 in U.S. Appl. No. 13/443,100.
USPTO; Final Office Action dated Feb. 14, 2017 in U.S. Appl. No. 13/466,412.
USPTO; Notice of Allowance dated Feb. 14, 2017 in U.S. Appl. No. 13/794,226.
USPTO; Notice of Allowance dated Feb. 15, 2017 in U.S. Appl. No. 13/794,145.
USPTO; Notice of Allowance dated Feb. 16, 2017 in U.S. Appl. No. 13/889,307.
USPTO; Advisory Action dated Feb. 27, 2017 in U.S. Appl. No. 13/468,880.
USPTO; Final Office Action dated Feb. 27, 2017 in U.S. Appl. No. 13/926,895.
Office Action dated Feb. 15, 2017 in Canadian Application No. 2,874,582.
USPTO; Notice of Allowance dated Mar. 10, 2017 in U.S. Appl. No. 13/467,503.
USPTO; Advisory Action dated Mar. 10, 2017 in U.S. Appl. No. 13/466,445.
USPTO; Advisory Action dated Mar. 13, 2017 in U.S. Appl. No. 13/466,412.

\* cited by examiner

LOYALTY INCENTIVE PROGRAM USING TRANSACTION CARDS

CROSS REFERENCE TO RELATED APPLICATION

This application is a continuation of, claims priority to and the benefit of, U.S. Ser. No. 11/779,734 filed on Jul. 18, 2007 and entitled "LOYALTY INCENTIVE PROGRAM USING TRANSACTION CARDS." The '734 application claims priority to U.S. Provisional Appl. No. 60/831,457, filed Jul. 18, 2006. The entire disclosures of both are incorporated herein by reference.

BACKGROUND OF THE INVENTION

Field of the Invention

The present invention relates generally to systems and methods for providing rewards or loyalty incentive programs to consumers, and more particularly to systems and methods for operating a loyalty incentive program using transaction cards to permit consumers to receive discounts without requiring a coupon to be redeemed.

Related Art

Loyalty incentive or reward programs are used as a form of highly customizable and targeted marketing. A loyalty program provider will attract customers who sign-up for a loyalty program. Shopping benefits such as discounts are offered to the customers by the provider. The provider then markets to merchants that the provider can bring customers to the merchant. For example, a loyalty program provider may approach a merchant, such as the clothing retailer GAP® Inc., with an offer to bring customers to the GAP® in exchange for a fee. The provider would then send a solicitation (via email or regular mail) to its customers offering, for example, a 10% discount coupon that may be redeemed at the GAP® on a particular day. The success of the solicitation can be assessed based on the number of coupons redeemed.

In such a loyalty solicitation, the merchant would pay the loyalty program provider a percentage of the sales (e.g., 10%) that result from the solicitation. The merchant benefits from the increased sales. The loyalty program provider benefits from the commission that it receives, and the customers benefit from the received discount.

There are several areas that could be improved in such traditional loyalty programs. For example, such traditional programs suffer from leakage. Leakage occurs when the merchant does not fully report sales resulting from the solicitation. Leakage results in loss revenues for the loyalty program provider. Further, administration of coupon redemption by a merchant is costly and requires training. What is needed is a system and method improving upon traditional loyalty programs.

BRIEF SUMMARY OF THE INVENTION

The present invention meets the above-identified needs by providing a system and method for providing customers with loyalty incentives.

One embodiment of the present invention provides a method for providing loyalty incentives to a card member customer, the method having the following steps: a record of charge is received for a purchase made with a participating merchant by a card member customer; the record of charge is used to determine whether the purchase by the card member customer qualifies for a rebate credit in accordance with a discount offer from the participating merchant; and if the purchase qualifies for the rebate credit, then the rebate credit is provided to an account of the card member customer.

In another embodiment, a method for operating a loyalty incentive program includes the following steps: a list of participating merchants is received; a list of participating card members is received; a record of charge corresponding to a purchase by a card member customer is received from a merchant, and upon receipt, an account of the card member customer is debited by the amount of the charge, a merchant identification contained in the record of charge is compared with the list of participating merchants, and a card member identification contained in the record of charge is compared with the list of participating card members. If the card member is a participating card member and the merchant is a participating merchant, then it is determined whether the record of charge qualifies for a rebate credit. If the record of charge qualities for a rebate credit, then the rebate credit is provided to an account of the card member customer.

In another embodiment, a method includes the following steps: participation of a merchant in a loyalty incentive program is solicited; an offer from a participating merchant is received; enrollment of a card member customer to the loyalty incentive program is solicited; the offer is provided to an enrolled card member customer; information is received which relates to a purchase by the enrolled card member customer in accordance with the offer from the participating merchant; an amount of a discount in accordance with the offer is calculated; and the amount of the discount is provided to a transaction account provider so that an account of the enrolled card member customer is credited in the amount of the discount.

One embodiment of the present invention provides a system including an enrolled card member customer database having identification information of accounts associated with card member customers enrolled in the loyalty incentive program; an enrolled merchant database having identification information of merchants enrolled in the loyalty incentive program; a merchant offer database having identification information of discount offers provided by the merchants enrolled in the loyalty incentive program; and a registered card processor. The registered card processor receives a record of charge for a purchase made with an enrolled merchant by an enrolled card member customer and uses the record of charge to determine whether the purchase qualifies for a rebate credit in accordance with a discount offer from the enrolled merchant. If the purchase qualifies for a rebate credit, the registered card processor provides the rebate credit to an account of the enrolled card member customer.

An advantage of the present invention is that it may be used to provide coupon-less discounts on purchase made by card member customers. Another advantage is no leakage since an enrolled merchant does not have to process any coupons. In such a system, the merchant benefits from increased sales and elimination of the overhead required to manage a coupon program, the customer benefits from the coupon-less discount, and the loyalty program provider benefits from sales commissions and/or loyalty program fees paid by the merchant. In one embodiment, customers may also he charged a fee by the loyalty program provider for participation in the loyalty program. Further features and advantages of the present invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements.

DETAILED DESCRIPTION

I. Overview

Figure 1:
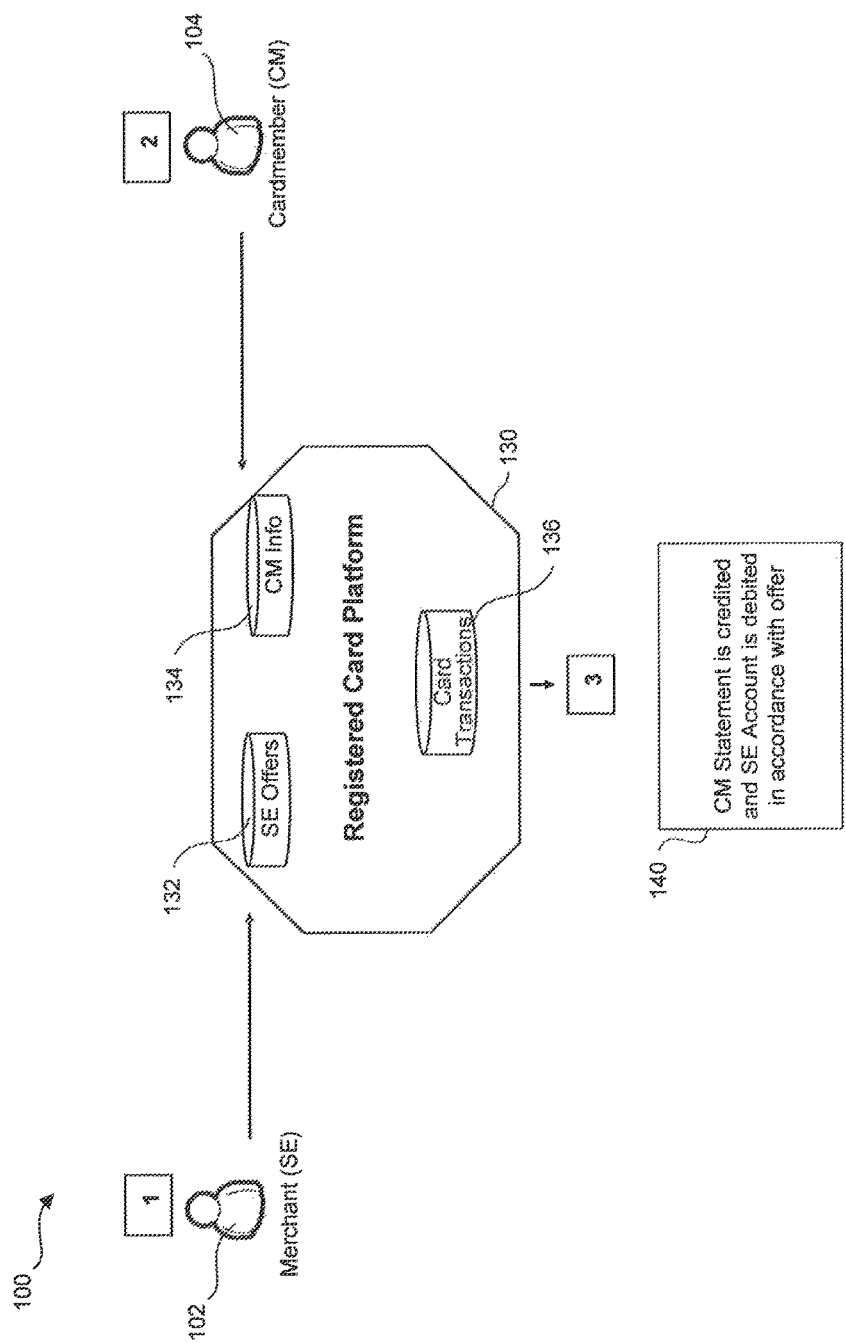
FIG. 1 is a high level flow diagram of a process for providing loyalty incentives to a card member customer in accordance with an embodiment of the present invention.

The present invention is directed to a system and method for providing loyalty incentives to a card member customer and operating a loyalty incentive program. The present invention is now described in more detail herein in terms of an exemplary embodiment. This is for convenience only and is not intended to limit the application of the present invention. While specific configurations and arrangements are discussed, it should be understood that this is done for illustrative purposes only. In fact, after reading the following description, it will be apparent to one skilled in the relevant art(s) how to implement the following invention in alternative embodiments. A person skilled in the pertinent art will recognize that other configurations and arrangements can be used without departing from the spirit and scope of the present invention. It will be apparent to a person skilled in the pertinent art that this invention can also be employed in a variety of other applications.

The terms "user," "end user," "consumer," "customer," "participant," and/or the plural form of these terms are used interchangeably throughout herein to refer to those persons or entities capable of accessing, using, being affected by and/or benefiting from the tool that the present invention provides for the rewards program described herein. This includes both individual consumers and corporate customers such as, for example, small businesses.

Furthermore, the terms "service provider," "business" or "merchant" may be used interchangeably with each other and shall mean any person, entity, distributor system, software and/or hardware that is a provider, broker and/or any other entity in the distribution chain of goods or services. For example, a service provider may be a retail store, a hotel company, an airline company, a travel agency, an on-line merchant or the like.

1. Transaction Accounts and Instrument

A "transaction account" as used herein refers to an account associated with an open account or a closed account system (as described below). The transaction account may exist in a physical or nonphysical embodiment. For example, a transaction account may be distributed in non-physical embodiments such as an account number, frequent-flyer account, telephone calling account or the like. Furthermore, a physical embodiment of a transaction account may be distributed as a financial instrument. The term "transaction card" is used herein to be synonymous with the term "transaction account," unless indicated otherwise.

A financial transaction instrument may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or be a fob having a transponder and an RFID reader.

2. Open Versus Closed Cards

"Open cards" are financial transaction cards that are generally accepted at different merchants. Examples of open cards include the American :Express®, Visa®, MasterCard® and Discover® cards, which may he used at many different retailers and other businesses. In contrast, "closed cards" are financial transaction cards that may be restricted to use in a particular store, a particular chain of stores or a collection of affiliated stores. One example of a closed card is a pre-paid gift card that may only be purchased at, and only be accepted at, a clothing retailer, such as the clothing retailer Gap®, Inc.

3. Stored Value Cards

Stored value cards are forms of transaction instruments associated with transaction accounts, wherein the stored value cards provide cash equivalent value that may be used within an existing payment/transaction infrastructure. Stored value cards are frequently referred to as gift, pre-paid or cash cards, in that money is deposited in the account associated with the card before use of the card is allowed. For example, if a customer deposits ten dollars of value into the account associated with the stored value card, the card may only be used for payments together totaling no more than ten dollars.

4. Use of Transaction Accounts

With regard to use of a transaction account, users may communicate with service providers in person (e.g., at the box office), telephonically, or electronically (e.g., from a user computer via the Internet). During the interaction, the service provider may offer goods and/or services to the user. The service provider may also offer the user the option of paying for the goods and/or services using any number of available transaction accounts. Furthermore, the transaction accounts may be used by the service provider as a form of identification of the user. The service provider may have a computing unit implemented in the form of a computer-server, although other implementations are possible.

In general, transaction accounts may be used for transactions between the user and service provider through any suitable communication means, such as, for example, a telephone network, intranet, the global, public Internet, a point of interaction device (e.g., a point of sale (POS) device, personal digital assistant (PDA), mobile telephone, kiosk, etc), online communications, off-line communications, wireless communications, and/or the like.

5. Account and Merchant Numbers

An "account," "account number" or "account code," as used herein, may include any device, code, number, letter, symbol, digital certificate, smart chip, digital signal, analog signal, biometric or other identifier/indicia suitably configured to allow a consumer to access, interact with or communicate with a financial transaction system. The account number may optionally be located on or associated with any financial transaction instrument (e.g., rewards, charge, credit, debit, prepaid, telephone, embossed, smart, magnetic stripe, bar code, transponder or radio frequency card), The account number may be distributed and stored in any form of plastic, electronic, magnetic, radio frequency (RF), wireless, audio and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y., Each issuer's credit card numbers comply with that company's standardized format such that an issuer using a sixteen-digit format will generally use four spaced sets of numbers in the form of:

$N_1N_2N_3N_4$ $N_5N_6N_7N_8$ $N_9N_{10}N_{11}N_{12}$ $N_{13}N_{14}N_{15}N_{16}$

The first five to seven digits are reserved for processing purposes and identify the issuing institution, card type, eta In this example, the last (sixteenth) digit is typically used as a sum check for the sixteen-digit number. The intermediary eight-to-ten digits are used to uniquely identify the customer, card holder or card member.

A merchant account number may be, for example, any number or alpha-numeric characters that identifies a particular merchant for purposes of card acceptance, account reconciliation, reporting and the like.

6. RFID and Transmission of Magnetic Stripe Data

It should be noted that the transfer of information in accordance with the present invention may be done in a format recognizable by a merchant system or account issuer. In that regard, by way of example, the information may be transmitted from an RFID device to an MD reader, or from the RFID reader to the merchant system in magnetic stripe or multi-track magnetic stripe format.

Because of the proliferation of devices using magnetic stripe format, the standards for coding information in magnetic stripe format were standardized by the International Organization for Standardization in ISO/IEC 7811-n (characteristics for identification cards) which are incorporated herein by reference. The ISOIEC 7811 standards specify the conditions the conformance, physical characteristics for the card (warpage and surface distortions) and the magnetic stripe area (location, height and surface profile, roughness, adhesion, wear and resistance to chemicals), the signal amplitude performance Characteristics of the magnetic stripe, the encoding specification including technique (MFM), angle of recording, bit density, flux transition spacing variation and signal amplitude, the data structure including track format, use of error correction techniques, user data capacity for ID-1, ID-2 and ID-3 size cards, and decoding techniques, and the location of encoded tracks.

Typically, magnetic stripe information is formatted in three tracks. Certain industry information must be maintained on certain portions of the tracks, while other portions of the tracks may have open data fields. The contents of each track and the formatting of the information provided to each track is controlled by the ISO/IEC 7811 standard. For example, the information must typically be encoded in binary. Track 1 is usually encoded with user information (i.e., name) in alphanumeric format. Track 2 is typically comprised of discretionary and nondiscretionary data fields. In one example, the nondiscretionary field may comprise 19 characters and the discretionary field may comprise 13 characters. Track 3 is typically reserved for financial transactions and includes enciphered versions of the user's personal identification number, country code, current units amount authorized per cycle, subsidiary accounts, and restrictions.

As such, where information is provided in accordance with the present invention, it may be provided in magnetic stripe track format. For example, the counter values, authentication tags and encrypted identifiers may be forwarded encoded in all or a portion of a data stream representing data encoded in, for example, track 2 or track 3 format.

Persons skilled in the relevant arts will understand the breadth of the terms used herein and that the exemplary descriptions provided are not intended to be limiting of the generally understood meanings attributed to the foregoing terms.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to effect such feature, structure, or characteristic in connection with other embodiments whether or not explicitly described.

II. System and Process

The invention is now described with reference to the figures. Referring first to FIG. 1, a high level flow diagram illustrates operation of an embodiment of the present invention. A transaction account provider (TAP) (such as American Express Travel Related Services Company, Inc., of New York, N.Y.) operates a registered card platform 130 to implement a reward or incentive program (sometimes referred to herein a registered card program), which does not require paper coupons for fulfillment of merchant offers to card members. Registered card platform 130 provides the capability to match merchant (SE or "service establishment") offers and card member (CM) customer information with card transactions for a card member customer's purchases or returns at a merchant participating in the registered card program. As a result of such matching capability, registered card platform 130 allows TAP to fulfill a merchant's discount offer applicable to card member customer's purchase by providing a rebate credit in accordance with the discount offer on the card member customer's transaction account statement. If a return is made on a purchase for which a rebate credit was previously provided, registered card platform 130 also allows the TAP to debit the card member customer the amount of the rebate credit and credit the same back to the merchant.

TAP can collaborate with a loyalty program provider to produce the reward or incentive program. While, as used herein, "loyalty program provider" (LPP) refers to an external, third-party provider of marketing packages that may be provided to CMs in accordance with the present invention, TAP may internally administer loyalty programs, such as restaurant or travel marketing program. Therefore, to distinguish from programs provided by an LPP, TAPs internal loyalty programs will be referred to herein as a "TAP marketing program" or simply a "TAP program." In the figures, the service mark "TailorMade" is used to refer to an example loyalty program offered by an LPP. Accordingly, although embodiments of the present invention will be described herein in the environment of such collaboration between a TAP and an LPP, one of skill in the pertinent art(s) will recognize that a registered card program can be implemented with or without a loyalty program provider or other types of providers without departing from the spirit and scope of the present invention.

As shown in FIG. 1, in step 1, a merchant 102 enrolls and submits a discount offer to a loyalty program or other marketing program. These offers are compiled in an offer database 132. In step 2, a card member customer (CM) 104 registers their transaction account managed by TAP, such that CM's account is "registered" to the registered card program, thereby permitting the registered CM to receive coupon-less discounts in the form of rebate credits (via CM's account statement). Information relating to CM's now registered card is compiled in enrollee database 134. When CM shops and makes purchases (or returns) at a merchant using their financial transaction card, TAP will receive a record of charge (ROC) for the transaction, which may be stored in a card transaction database 136. The ROC may be any information that can be used to identify a card transaction. In step 3, matching is performed by registered card platform 130. In the ease of a CM purchase, the CM's statement is credited and the merchant's account is debited in accordance with the merchant's offer, as illustrated in step 140. Further description of providing a credit to the CM and a debit to the merchant in step 140 is described below with reference to FIG. 3.

Figure 2:
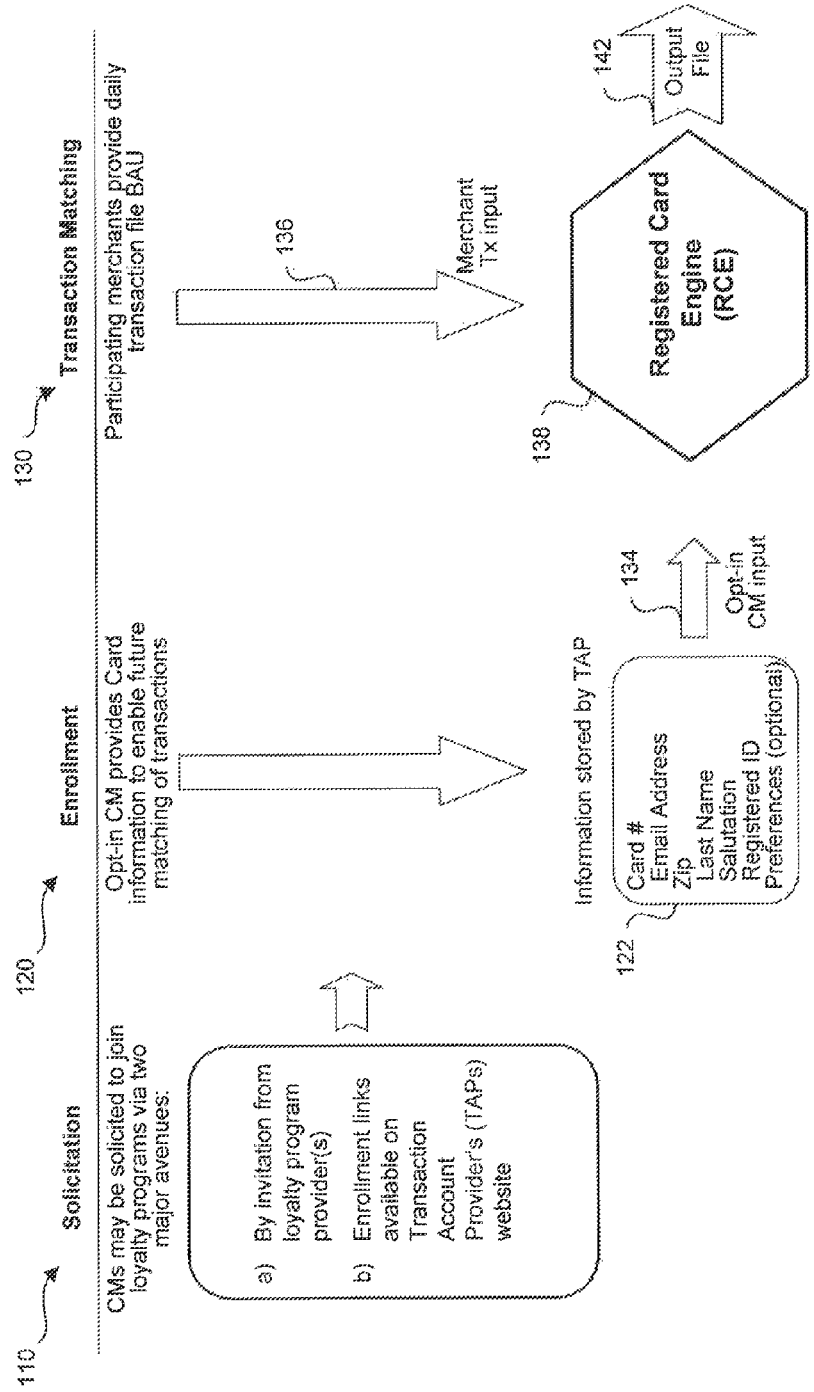
FIG. 2 is a high level flow diagram showing data management flow of card member customer information and participating merchant information for transaction matching in the process of FIG. 1.

FIG. 2 provides another high level flow diagram illustrating the steps of solicitation 110 and enrollment 120 relative to transaction matching 130 (performed by the registered card platform), in accordance with an embodiment of the present invention, Solicitation 110 of a CM may include a targeted invitation, such as by e-mail, from loyalty program provider(s) or TAP, or by simply making available to a CM a link on TAP's website prompting the CM to enroll in TAP's registered card program. During enrollment 120, the CM opts to register their card information to enable registered card platform 130 to perform future matching of transactions. Box 122 sets forth exemplary fields of information stored by TAP for each enrolled CM. CM information is stored in database 134 (represented here as an arrow 134), and the information is provided to a matching transaction processor 138 of registered card platform 130. Matching processor 138 is shown and described in the example embodiments presented using the term "registered card engine" (RCE). As shown, in FIG. 2, RCE 138 is provided with merchant transaction information from participating merchants (i.e., a daily, "business as usual" (BAU) transaction file). This transaction information may be stored in transaction database 136 (shown here as an arrow 136). RCE 138 also receives participating merchant offers 132 (shown in FIG. 1) and matches them with transactions 136 made by registered CMs (i.e., via information from enrollee database 134). Matched transactions are provided in an output file 142.

Figure 3:
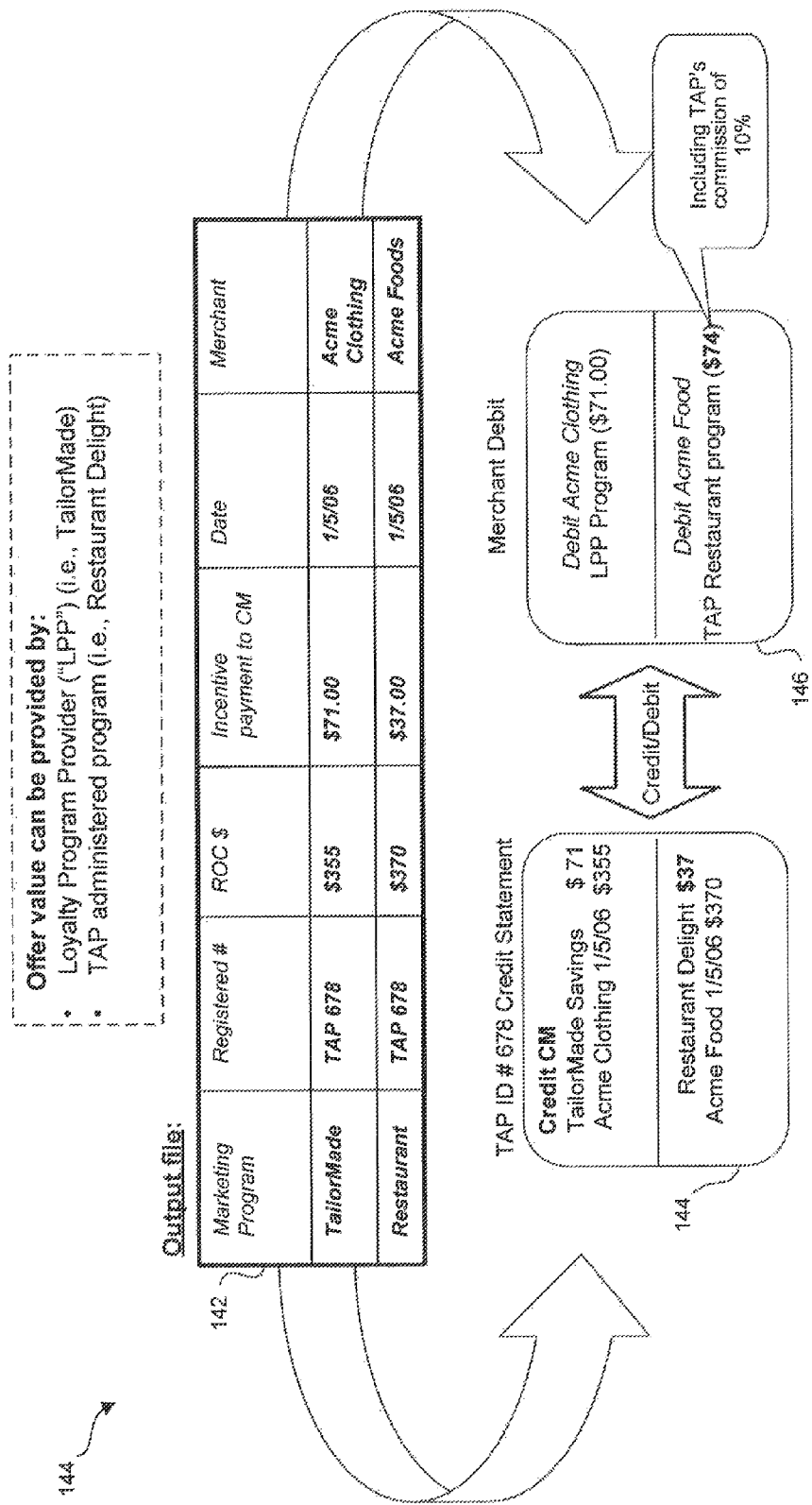
FIG. 3 illustrates an exemplary output file of matched transactions with corresponding statements of credit to a card member customer and debit to participating merchants.

FIG. 3 illustrates an exemplary output file and credit and debit statement for the CM and the merchant, in accordance with step 140 of FIG. 1. Output file 142 from RCE 138 (as shown in FIG. 2) includes an itemization of a discount amount (i.e., incentive payment) to CM for a purchase made (i.e., ROC) at a participating merchant in which a discount offer was applicable. In this embodiment, upon enrollment in the registered card program, the registered accounts of the CM receive a registration identification (i.e., "registered #"), which is also included in output file 142. In this embodiment, output file 142 includes marketing programs administered by TAP and marketing programs administered by a loyalty program provider. One of skill in the pertinent art(s) will recognize that output file 142 may be configured in any number of ways and include less or more information represented in FIG. 3 without departing from the spirit and scope of the present invention. For example, a separate output file may be provided for each LPP or TAP program, and for each loyalty program offered by the same LPP. Further, the transaction and discount information reflected therein may be provided collectively or separately for downstream processing of a CM credit statement 144 and a merchant debit statement 146.

As shown in FIG. 3, output file 142 is processed by TAP to provide line item rebate credits on CM statement 144 for each purchase subject to a discount offer available pursuant to a marketing program. For example, CM statement 144 includes a TailorMade rebate credit of $71, for an original charge amount of $355 at participating merchant, Acme Clothing. Similarly, a credit of $37 under TAP's restaurant marketing program is provided for an original charge amount of $370 at participating merchant, Acme Food. Merchant debit statement 146 includes line item debits in accordance with CM's rebate credits also as line items for each marketing program. The debit for the merchant may be equal or unequal to the rebate credit to CM. For example, for Acme Clothing, the merchant debit of $71 is equal to CM credit of $71, whereas the debit for Acme Food is $74, corresponding to the sum of the rebate credit to CM and a commission or service fee of 10% of the original charge amount imposed by TAP for performing the services described herein. Although not shown here, a similar commission may be imposed by LPP and/or TAP on Acme Clothing's account and incorporated as part of a line item debit on its statement. Alternatively, such commission may be a separate line item from the line item for the merchant's debit for CM's rebate credit.

Figure 4:
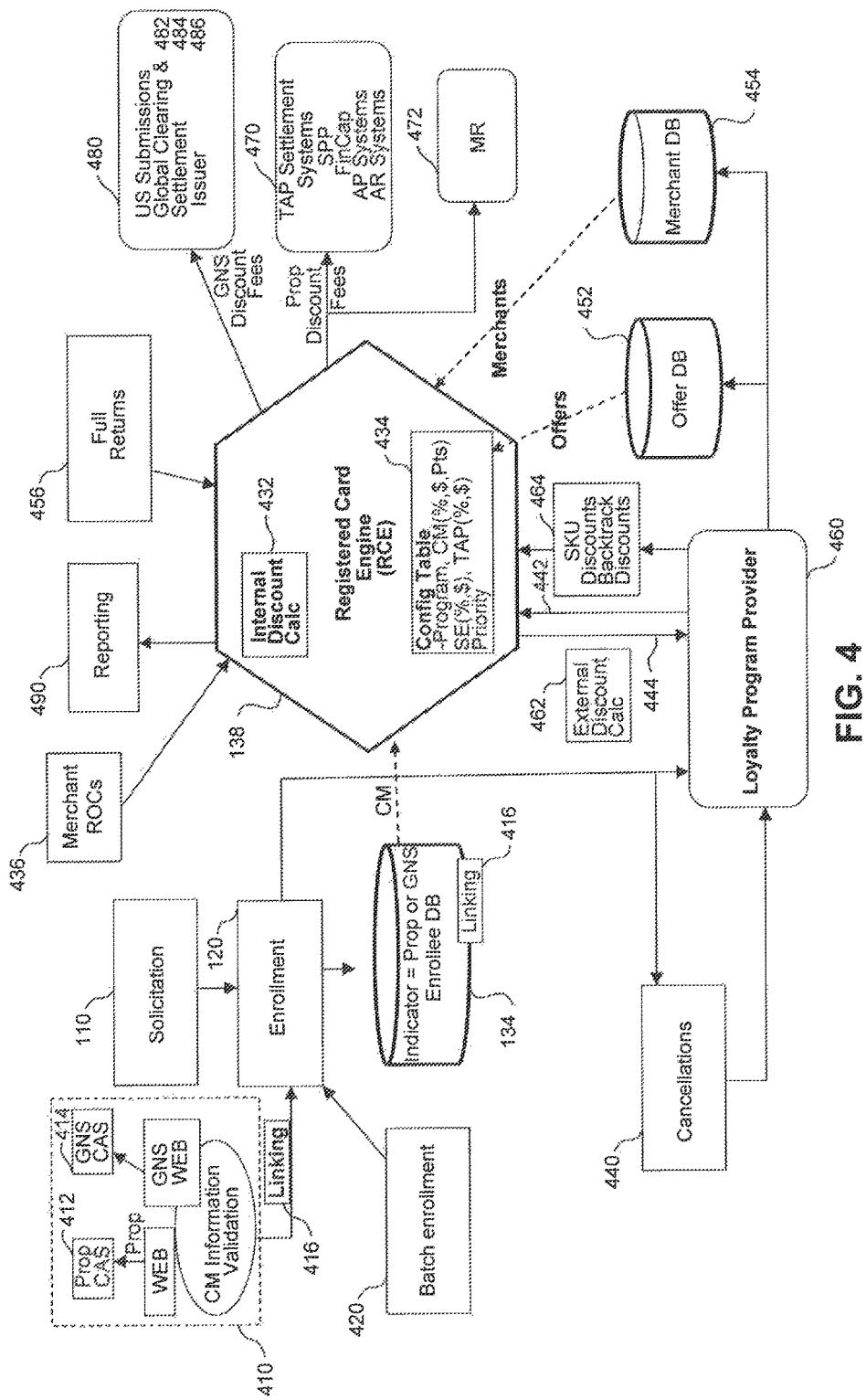
FIG. 4 is a detailed high level flow diagram of the process of FIG. 1, in accordance with an embodiment of the present invention.

FIG. 4 is a detailed high level block diagram of the process of FIG. 1, showing processes for registration of a CM, calculation of a rebate credit to the CM (or a negative discount amount in case of a return), and downstream settlement with the CM and the merchant relating to the rebate credit (or negative discount amount), in accordance with an embodiment of the present invention. The CM registers with TAP to receive coupon-less discounts for purchases drawn on their transaction card/account. Generally, the registration process begins with solicitation 110 of the CM, followed by enrollment 120 of one or more transaction cards held by the CM. Description of exemplary embodiments of process for solicitation 110 and enrollment 120 will be provided further below. In order to enroll, each transaction card and corresponding customer information undergoes a validation process 410 to determine whether the CM's card is eligible for participation in TAP's registered card program. This registered card program may be made available to not only CMs holding transaction cards issued by TAP, but also to CMs holding cards issued by third party transaction account providers in a brand network. Third party transaction account providers are referred to herein collectively as Global Network Services (GNS). For example, "American Express" branded cards are available from both American Express Travel Related Services Company, Inc (referred to herein as proprietary cards, or "Prop cards") as well as from other issuers (referred to herein as "GNS cards"), such as Citibank, N.A. of New York, N.Y. Accordingly, validation process 410 may include validation of proprietary cards and GNS cards. For proprietary cards, customer information is validated by TAP's card authorization system (CAS) 412, and for GNS cards, CM information is validated by GNS's card authorization system 414.

The CM may be provided the option to enroll more than one card and link each second and additional card to a primary enrolled card, which is illustrated in FIG. 4 as linking 416. Linking 416 provides the capability to assign a single registration identification to the CM and provides the CM the flexibility to make a purchase on any of the linked cards, with discount payments appearing on the CM's statement for the primary card. The linked cards may be all Prop cards, all GNS cards, or a mixture of Prop and GNS cards. Further, the linked cards assigned to a single registration identification may be corporate cards, personal cards, or a mixture thereof The registration process may also include the capability of batch enrollment 420 of a plurality of cards of one or more CMs in a single instance information relating to enrolled CMs are stored in enrollee database 134. Information relating to linking 416 of a plurality of cards to the CM is also contained therein. Information from the enrollee database 134 may then be provided to RCE 138, as described above with reference to FIG. 2.

In the embodiment of FIG. 4, information on participating merchants and their offers are divided into separate databases, i.e., an offer database 452 and a merchant database 454, and provided to RCE 138. As described above, TAP may collaborate with a loyalty program provider (LPP) 460 to deliver loyalty incentives to the CM in the form of coupon-less discounts. Accordingly, offer database 452 and merchant database 454 may be populated by TAP and/or LPP, with offers and merchants associated with TAP's marketing programs and LPI's marketing programs, respectively. TAP may screen merchants participating in LPP's marketing programs prior to accepting and storing them in merchant database 454. TAP's program administrator (not shown) may upload merchants and offers to the respective databases along with other information associating merchants and offers with one or more marketing programs.

For marketing programs administered by TAP, registered card engine 138 may include its own calculation of discount 432 for purchases made by registered CMs with merchants participating in TAP's marketing program. Further, LPP 460 may be responsible for calculation of discount 462 for purchases made at merchants participating in marketing programs administered by LPP 460. A merchant may be a participating merchant for a plurality of externally administered and/or internally administered marketing programs. Therefore, these offer and merchant databases may include a field identifying each offer and merchant to one or more marketing programs, as further described below with reference to FIG. 5.

Another input to RCE 138 are merchant ROCs 436, which may be compiled as a daily transaction file and stored in transaction database 136 (shown in FIGS. 1 and 2). RCE 138 performs transaction matching of merchant ROCs 436 with enrolled CM information from enrollee database 134 and participating merchant and offer information from respective databases 454 and 452. Further detail regarding this matching will be described below with reference to FIGS. 5 through 7. Matched transactions relating to loyalty programs administered by loyalty program provider 460 are provided as an output file 444 to LPP 460 for discount calculation 462, whereby LPP 460 returns an output file (represented here as arrow 442), which includes the discount amount, or rebate credit, similar to the incentive payment field in output file 142 described above with reference to FIG. 3. This process of discount calculation by LPP 460 and exchange of information thereof with RCE 138 is discussed below with reference to FIG. 8.

A problem to be overcome in implementing a loyalty incentive program as described herein is how to deal with returns. For example, assume a card member makes a purchase for $100 and receives a 10% discount (also called a rebate or incentive) on his or her account. If the card member then returns the purchased goods to the merchant, it is desirable to be able to ascertain whether the purchase involved an incentive so that a return credit can be made in the appropriate amount. The present invention solves this problem and provides a mechanism for dealing with returns. In the embodiment of FIG. 4, RCE 138 has the capability to process returns 456 on purchases for which a registered CM may have been provided a rebate credit pursuant to a marketing program. If a rebate credit had been previously provided, then processing of returns 456 includes providing a credit to the merchant for the earlier debited amount of the rebate credit provided to the CM and providing a corresponding debit to the CM of the earlier rebate credit. Processing of returns is similar to the transaction processing of purchases and is described in greater detail below with reference to FIGS. 6 and 7. Accordingly, output file 444 from RCE 438 may include return transactions, whereby loyalty program provider 460 calculates a negative discount, or a discount reversal amount, 464 for each eligible return. Eligible returns may be identified based on a stock keeping unit (SKU) associated with the purchase or based on the date of the purchase and the amount of the purchase (i.e., "backtrack discounts"). Logic associated with matching prior purchases with returns by means other than SKUs is described in further detail with reference to FIGS. 11 and 12.

RCE 138 has the capability to convert the discount amount to an equivalent of membership reward points which may be redeemable in accordance with membership rewards program. Typically, a membership rewards program offers goods or travel packages in exchange for membership reward points. Moreover, the discount amount may be a combination of a monetary credit and an equivalent of reward points. To implement such conversions, as well as to support service fee calculation, etc. RCE 138 may include a configuration table 434. Configuration table 434 may include fields for each marketing program and corresponding information for converting the calculated discount (i.e., the rebate credit) between a monetary credit and/or an equivalence in membership rewards points (shown as "CM (%, $, Pts)"), Further, since a discount offer may be represented in units of monetary amount off or percent off a purchase price, or in terms of membership rewards points, then for internally calculated discounts 432, RCE uses configuration table 434 to match program, merchant, and conversion terms (shown as "SE (%, $)") to convert the offer terms to the desired units for discount calculation. Configuration table 434 may also have a field for TAP's service fees for each program and participating merchants, and service fees may be in units such percent of purchase or monetary amount (shown as "TAP (%, $)"). Further, since a merchant may be submitting the same offer for more than one marketing program, configuration table includes a "priority" field that is used to identify repeated offers and ensure that the CM receives only a single rebate credit on a purchase that is eligible to receive a discount pursuant to multiple marketing programs.

The calculated discount (or discount reversal, if relating to a return) is provided to TAP settlement systems 470 for transactions on Prop registered cards, or to GNS settlement systems 480 for transactions on GNS registered cards. An AR system of TAP settlement systems 470 processes the discount amount and provides the rebate credit (as a monetary credit or an equivalence in reward points, or both) on CM's credit statement. If the rebate credit includes membership reward points, then information relating the rebate credit is also provided to membership rewards 472 for appropriate record keeping for that CM, AP systems of TAP settlement systems 470 processes the merchant debit in accordance with CM's rebate credit, as well as any service fee charged by TAP for providing the services described herein. Further detail regarding processing of matched transactions via TAP settlement systems is described below with reference to FIG. 8, GNS settlement systems 480 includes US, submissions 482, global clearing and settlement 484, and one or more issuers 486. Global clearing and settlement 484 may be considered a repository for RCE 138s matched transactions associated with GNS cards so as to permit each GINS issuer 486 to retrieve their respective GNS card transaction information, including information of the discount and any service fees charged by TAP. GNS issuers 486 may then use this information to provide a rebate credit to CMs accounts managed by issuers 486 and to provide a debit to participating merchants in a similar manner as described above with reference to FIG. 2. Further details regarding application of the registered card program to GNS registered cards is described below with reference to FIGS. 9 and 10.

RCE 138 may further have the capability to provide TAP with reporting 490, which may include a marketing analysis or monitoring of the success of various marketing programs and information relating to card member participation therein. Reporting 490 thereby permits TAP to target CMs and deliver merchant offers that are desirable to its registered CMs and/or merchants.

Cancellations 440 of registered accounts by enrolled CMs are communicated to loyalty program provider 460 as well as to enrollment 120 so as to maintain enrollee database 134 with up-to-date enrolled CM information. Cancellations 440 may arise, for example, from a CM reporting a lost or stolen card or a CM requesting TAP to deregister one or more of its registered cards from the registered card program. It is an advantage of the invention that enrollee database 134 may be provided with timely and consistent updates to reflect lost and stolen cards. Cancellations 440 may also include deregistration of a CM from one or more particular marketing programs administered by TAP or LPP 460.

Further description will now be provided with respect to solicitation 110 and enrollment 120. As noted above with reference to FIG. 2, CM may be solicited to join an incentive program offered by TAP via an email invitation from LPP 460. In this instance, a CM may receive a solicitation email providing a link to a loyalty program's website landing page, whereby the CM may begin an enrollment process. The enrollment may include, for example, the steps of agreeing to the incentive program's terms and conditions, setting up a username and password and selecting marketing preferences, etc. Moreover, such an incentive program website may be hosted by LPP 460 and branded by TAP. As such, the enrollment process may further include providing TAP with the CM's email address, such as when the card member clicks on the link of the solicitation email to start the enrollment process. TAP may use CM's email address to validate the CM prior to enrollment 120 via validation process 410. Further, the incentive program's website may provide registered CMs with a customized home page where they may be presented with personalized offers (such as those identified based on their selected marketing preferences), as well as being able to engage in online shopping of goods and services offered by merchants participating in the particular marketing program(s) in which the card member enrolls. If a CM receives an email solicitation but is already enrolled in TAP's registered card program, then by clicking on the link provided in the solicitation email, the already enrolled CM may be prompted to log in to their customized homepage. As noted above, a CM may be solicited indirectly simply by being provided with access to a website link to the enrollment webpage and/or TAN enrollment webpage for the registered card program. Further, enrollment in TAP's registered card program via a TAP-hosted website link may allow for enrollment in TAP's marketing programs as well as a marketing program offered in collaboration with one or more loyalty program providers, Solicitation 110 may further include a pre-solicitation process prior to sending a solicitation email to a targeted GM. The pre-solicitation process may involve determining which CMs should be targeted and which offer clusters and particular marketing programs the CM may be eligible to participate in pursuant to the registered card program. Accordingly. TAP may collaborate with LPP 460 to identify appropriate CMs for email solicitation based on TAP's data on a CM's spending preferences and the LPP's clusters of merchant offers. These identified, targeted CMs may then reviewed so as to exclude solicitation of any targeted CMS having opted out of receiving direct marketing materials from TAP or LPP 460. TAP then provides LPP 460 with a marketing list of targeted CMs and associated identifying information (such as salutation, name, gender, and zip code). The marketing list may further be provided to LPP 460 with a given effective period during which solicitation emails may be sent, since the list should be updated periodically to exclude CMs from the list that have since opted out of receiving marketing materials. Upon receipt of the marketing list from TAP, loyalty program provider sends out email invitations to the targeted CMs.

Enrollment 120 may provide an option to the CM to participate in the registered card program as a preferred enrollee. For example, during enrollment a card member may choose to be eligible for "premium" offers in exchange for paying an enrollment fee. Alternatively, the CM may wish to forego payment of any enrollment fee and be eligible for "everyday" offers. Preferred (i.e., premium) customers may also be eligible for everyday offers. TAP's registered card program may therefore offer tiers of offer packages corresponding to the "premium" and "everyday" tiers of enrolled card members. Accordingly, RCE 138, during transaction matching, may consider whether an enrolled CM is registered as a premium card member or an everyday card member so as to identify CM purchases that qualify for a premium offer and/or an everyday offer.

Figure 5:
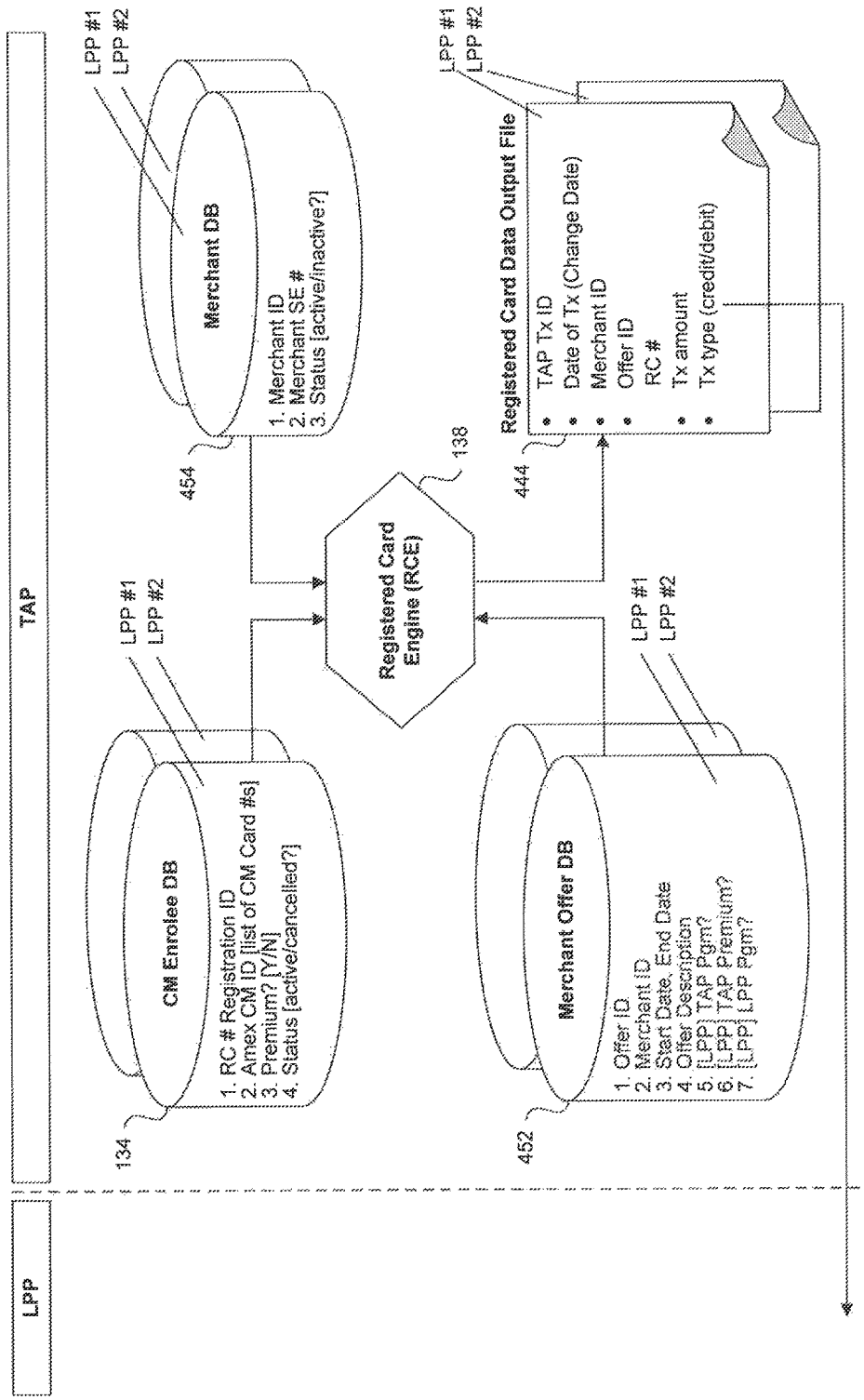
FIG. 5 is a high level flow diagram showing data flow of card member customer information and participating merchant information for transaction matching, in accordance with an embodiment of the present invention.

An embodiment of the present invention in Which TAP collaborates with loyalty program provider 460 will now be described in greater detail with reference to FIGS. 5 through 8. FIG. 5 illustrates transaction-based data flow between databases at TAP during transaction matching by RCE 138. As shown, CM enrollee database 134 may include such data as a CM's registration identification (RC # ID) for one or more registered transaction cards linked together in accordance with linking step 416, described above; a list of account numbers for these linked cards; indication of Whether the CM is a premium card member; and whether the CM and/or their registered transaction card(s) are active or canceled pursuant to cancellations 440 (shown in FIG. 4). A second enrollee database (i.e., database identified as "LPP# 2") and other additional enrollee databases may he provided for enrollees of each distinct loyalty program or program provider. Alternatively, a single enrollee database 134 may be provided for all enrollees of the registered card program, with another data field provided which identifies the one or more loyalty program providers the CM is associated with. Likewise, separate merchant database may be provided for each loyalty program or program provider, or a single database may be provided with a data field identifying the merchant with the program(s) or provider(s). Merchant database 454 may include a merchant ID, its SE #, as well as whether the merchant is actively or inactively enrolled in the registered card program, Merchant offer database 452 may include an offer ID, a corresponding merchant ID, a start and end date for the particular offer, a description, and whether the offer is a premium offer, as described above. Since TAP and LPP may each administer marketing programs, and since there may he multiple loyalty program providers, merchant offer database 452 may also include a field identifying each TAP or LPP marketing program to which the offer belongs. FIG. 5 also shows exemplary data contained in output file 444 provided to the loyalty program provider(s) for discount calculation (or discount reversal calculation, in the ease of return), as described above with reference to FIG. 4. In this figure, "Tx" represents the term "transaction." As shown, output file 444 includes: transaction ID, transaction date, merchant ID and offer ID, card member's registration identification (RC#), transaction amount, as well as whether the transaction type is a credit (return) or a debit (purchase).

In this embodiment, output file 444 includes CM's RC# as a substitute for the CM's actual transaction account number. Output file 444 is provided to LPP for discount calculation, and the level of security associated with LPP's network may prohibit allowing LPP using the actual account number as a means to identify the transaction for discount calculation. However, it should be understood that for internally calculated discounts 432 (described in FIG. 4) or in instance where secure networks exists with the loyalty program provider(s), then output file may contain the particular transaction account number associated with the transaction. As such, the discount calculated by LPP may be directly matched with the card number and may also be provided on the statement for a secondary card, rather than appearing on the statement of the primary card, which may occur when several linked cards are associated with CM's registration identification (RC#).

Figure 6:
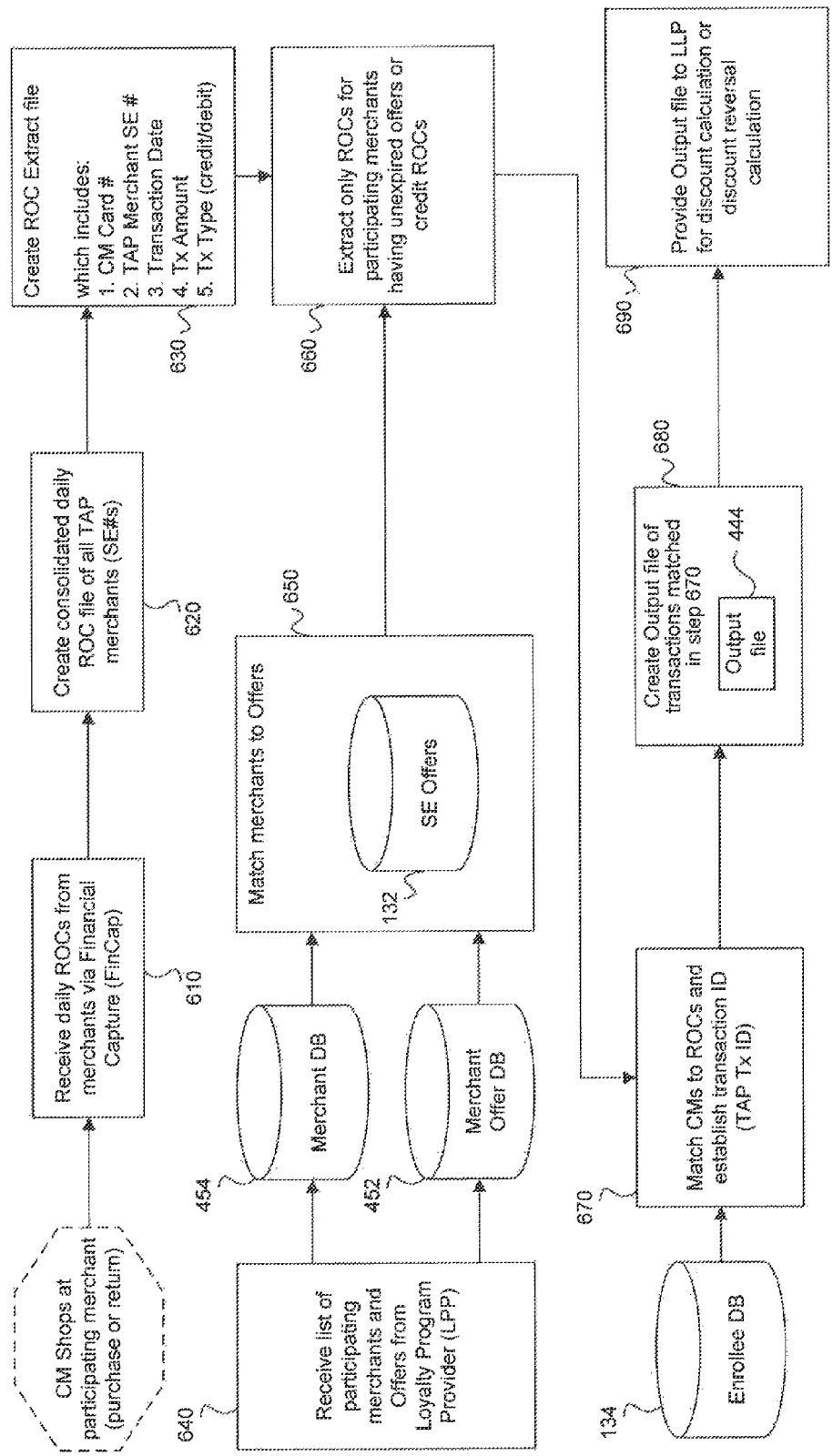
FIG. 6 is a flow diagram of a transaction matching process, in accordance with an embodiment of the present invention.
Figure 7:
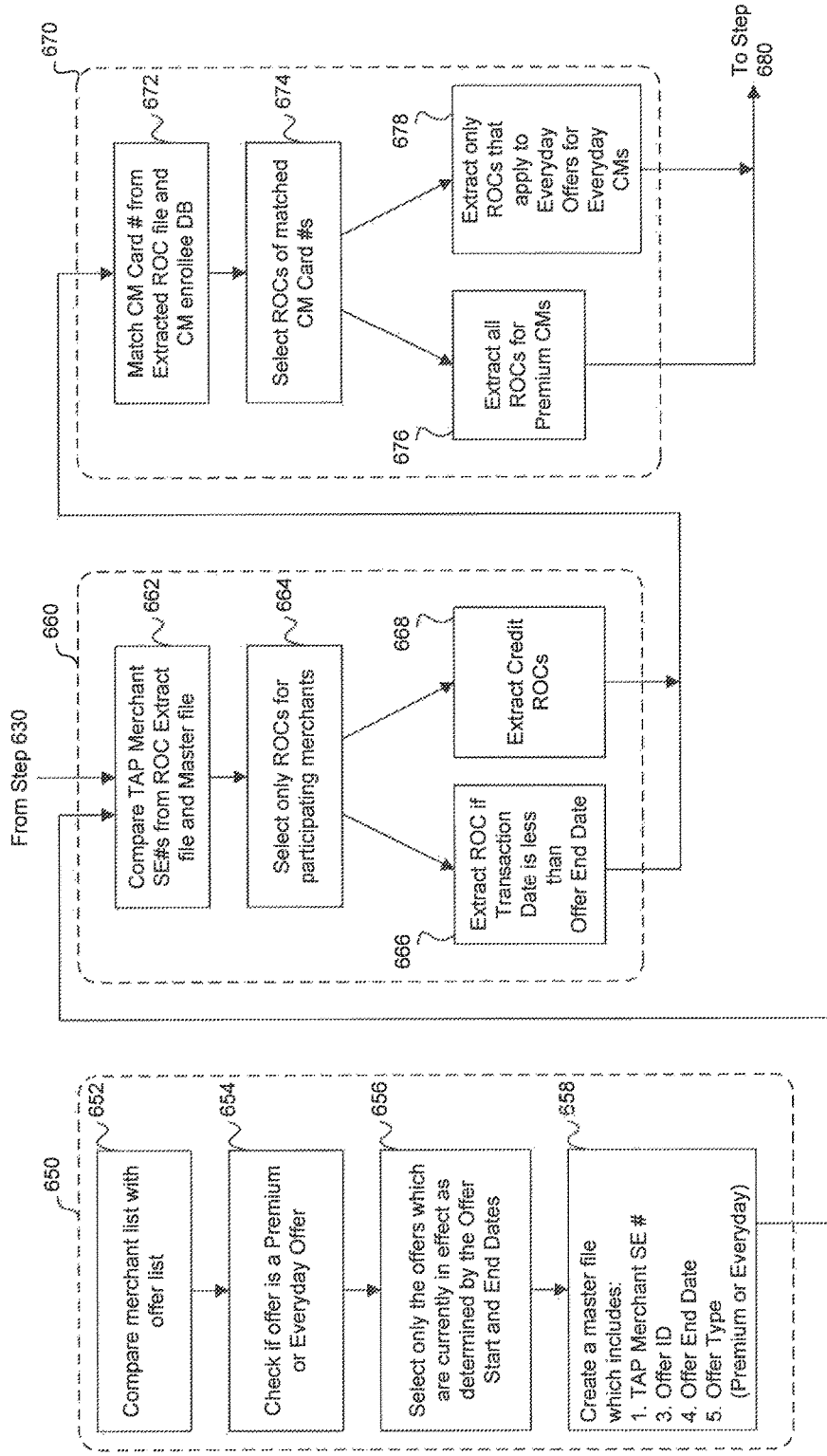
FIG. 7 is a flow diagram illustrating the processes associated with individual steps shown in FIG. 6.
Figure 8:
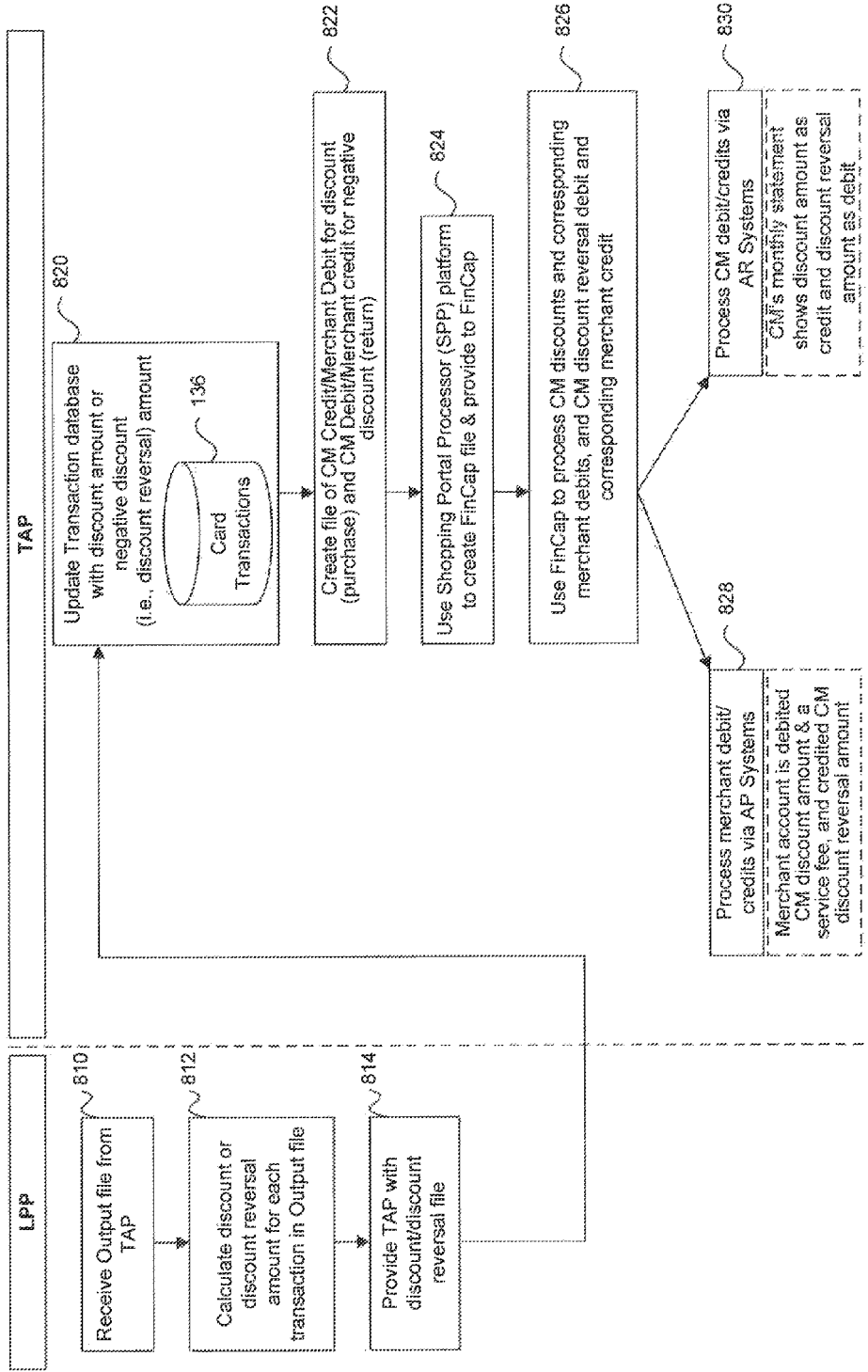
FIG. 8 is a flow diagram of transaction based data flow between a third party loyalty program provider and a transaction account provider, in accordance with an embodiment of the present invention.

FIGS. 6 and 7 show in greater detail the process of transaction matching by RCE 138 when a registered CM shops at a participating merchant. FIG. 8 shows in detail an embodiment of a process for calculation (via LPP) of CM discount credits and discount reversal debits and their subsequent processing so as to appear on CM and merchant statements. The processes of FIGS. 6 through 8 are shown to incorporate both CM purchases and their returns. Accordingly, the output file provided to LPP and an input file from LPP to TAP (as shown and later described in step 814 in FIG. 8), as well as creation of a file of merchant credit-debit and card member credit/debit (as shown in step 822 of FIG. 8), are described to include information relating to both purchases and returns. It should be understood, however, that individual files at the noted steps may be provided, one for processing of discounts for purchases and another for processing discount reversals for returns, without departing from the spirit and scope of the present invention. Further description of methodologies for identifying whether a return is on a purchase for which a CM received a discount will be described with reference to FIGS. 11 and 12.

FIG. 6 shows steps in a process from the point when the card member makes a purchase or return at a particular participating merchant to when an output file is provided to an LPP for discount calculation (or discount reversal calculations). In step 610, TAP receives daily ROCs from merchants via its financial capture system (FinCap). In step 620, TAP creates a consolidated daily ROC file of all merchants associated with TAP. As part of the consolidation, TAP may monitor ROC submissions for return ROCs, i.e., ROCs having a negative amount for the transaction amount, and/or for which the transaction type is identified as a credit, whereby the transaction may be subject to additional processing to determine whether a negative discount (i.e., discount reversal) is due prior to including the transaction on the output file provided to the LPP for discount reversal calculation. In step 640, TAP receives the list of participating merchants and offers from LPP. Participating merchants and offers are stored in merchant database 454 and merchant offer database 452, respectively. At step 650, merchants are matched to offers, and at step 660, ROCs are extracted for only those participating merchants that have unexpired offers. Also extracted are credit ROCs (i.e., ROCs for returns).

Once TAP identifies credit ROCs from participating merchants, TAP may compare them to transaction debits stored in transaction database 136 (see FIG. 8) over a given time period (e.g., the last 60 days, or the last 90 days) to determine whether there exists a debit ROC with the same merchant as the credit ROC, for the same registered card. If found, TAP further cheeks to see if the previous transaction was eligible for a rebate credit and the amount of the rebate credit that was provided to the CM. If the previous transaction is eligible for a rebate credit, then a debit corresponding to the amount of the rebate credit in full (corresponding to full returns) or in part (corresponding to partial returns) is charged to the card member. These debits thereby adjust the net return credit to equal the original purchase price less the rebate credit. The merchant is reimbursed for the amount of the debited rebate credit, and the merchant's reimbursement appears as a credit on the merchant's account. The determination of the discount reversal amount (i.e., amount of the debited rebate credit) is preferably based on the CM's rebated credit on the original purchase rather than the debit received by the merchant, since the merchant's previous debit for the CM's rebate credit may include an associated service fee imposed by TAP and/or LPP. As noted above, in one embodiment, stock keeping units (SKI's) of purchased goods/services are used to match purchases with returns and determine the discount reversal amount. In another embodiment, certain assumptions are made in accordance with a return logic policy to do the matching. Exemplary return logic policy is described below with reference to FIGS. 11 and 12.

At step 670, CM information in enrollee database 134 is used to match registered CMs with ROCs extracted in step 660, and each matched transactions is provided with a transaction In step 680, output file 444 is created of transactions matched in step 670. At step 690, output file 444 is provided to loyalty program provider for discount/discount reversal calculation.

FIG. 7 shows in greater detail the matching processes of steps 650 and 670 and the process of extraction step 660 of FIG. 6, in accordance to an embodiment of the present invention. Step 650, for the matching of merchants to offers, may include steps 652, 654, 656 and 658. In step 652, the list of merchants from merchant database 454 is compared with the list of offers in merchant offer database 452. In step 654, offers are checked to be either premium or everyday offers. In step 656, offers are selected for inclusion in a master file in step 658 if the offers are currently in effect as determined by the offer start and end dates, and in step 658, a master file is created which includes the merchant SE#, the offer ID, the offer end date, and the oiler type (premium or everyday). Extraction step 660 receives the ROC extraction file from step 630 (see FIG. 6) as well as the master file of step 658. In this embodiment, extraction step 660 includes steps 662, 664, 666 and 668. In step 662, merchant SE#s are compared to the ROC extract file of step 660 and master file of step 658, and in step 654, ROCs for merchants participating in TAP's registered card program are selected. Of the selected ROCs for participating merchants, the ROCs are extracted if (in step 666) the transaction date is less than the offer end date reflected in the master file, or if (in step 668) the ROC is a credit ROC. These extracted ROCs are an input to matching step 670 that includes steps 672, 674, 676 and 678. In step 672, CM account card numbers from the extracted ROC file are matched with the registered accounts stored in enrollee database 134. In step 674, those ROCs corresponding to the registered accounts of CMs are selected. If the registered CM is a premium CM then at step 676, all ROCs are extracted for the CM; otherwise, at step 678 only ROCs that apply to everyday offers are extracted for the CM. These extracted ROCs are provided to step 680 of FIG. 6 for creation of output file 444.

As shown in FIG. 8, the LPP receives output file 444 from TAP at step 810. In step 812, the LPP calculates the discount or negative discount (i.e., discount reversal) amount for each purchase and return transaction, respectively, in step 814, a file including a discount or discount reversal calculation (such as file 442 provided to RCE 138, described above in FIG. 4) is provided to TAP. TAP uses this file at step 820 to update its transaction database with discount amounts or negative discount amounts, whereby the original ROC transaction is matched with these discounts or negative discounts. At step 822. TAP creates a file of CM credits and corresponding merchant debits for discounts associated with a purchase. Further, TAP may include CM debits and merchant credits for negative discounts associated with returns.

In step 824, TAP's SPP (shopping portal processor) platform is used to create a FinCap file which is provided to FinCap, and in step 826, FinCap processes CM discounts (i.e., rebate credits) and CM discount reversals. In particular, as described above in FIG. 4, RCE 138 provides TAP's AP (accounts payable) system with information on merchant debits and credits for processing at step 828 and provides TAP's AR (accounts receivable) system with information on card member debits and credits for processing at step 830. Pursuant to step 828, a merchant's account is debited for the CM's rebated credit, may be further debited a service fee, and is credited a CM's discount reversal amount in the case of an eligible return. Pursuant to step 840, a CM's account (or monthly statement) shall show a credited amount in accordance with any rebate credit and a debited amount in accordance with any discount reversal arising from an eligible return.

Figure 11:
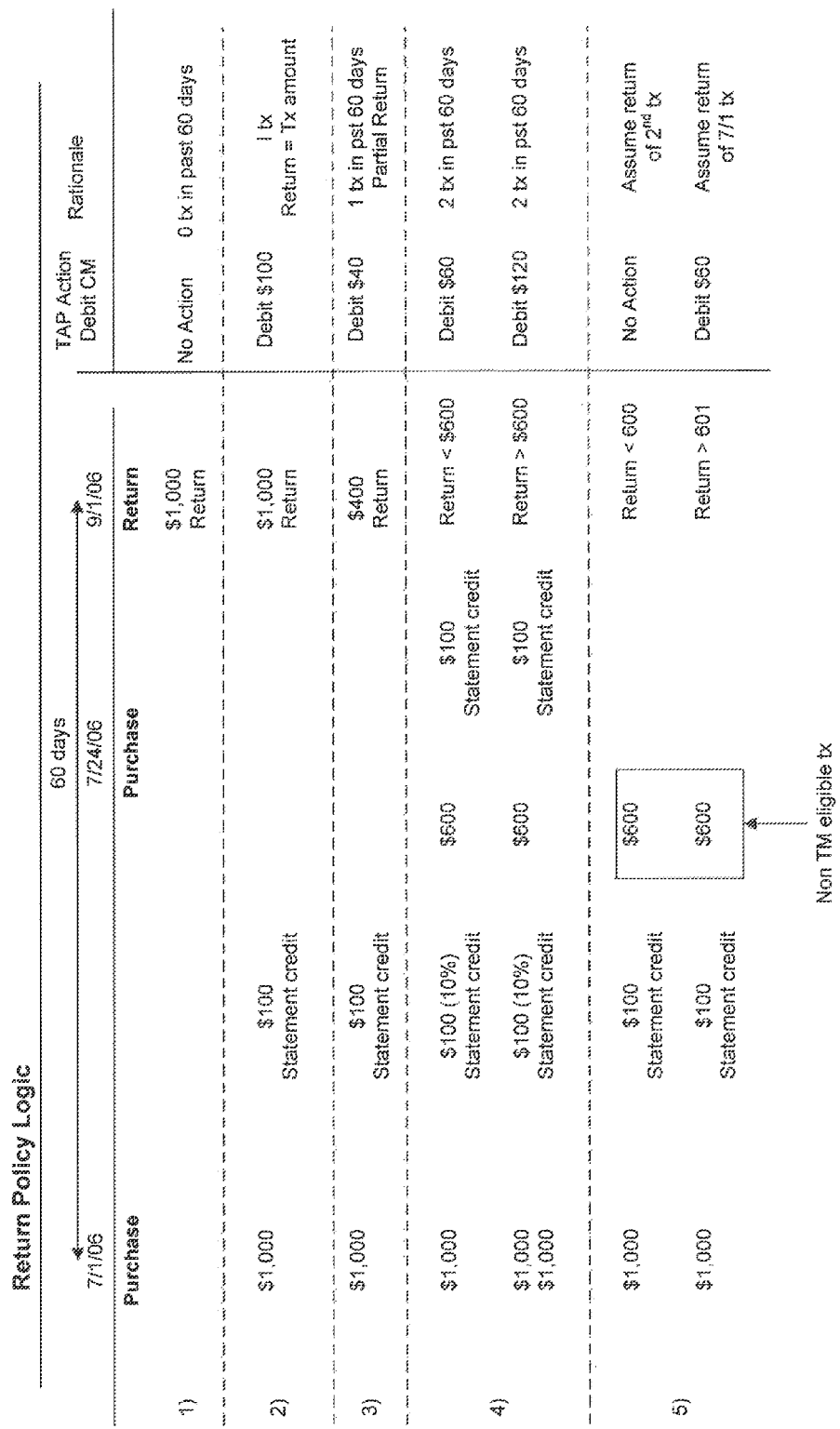
FIG. 11 is a diagram of a method for determining whether a return relates to a purchase for which a rebate credit was provided to the card member customer, in accordance with an embodiment of the present invention.

Methodologies unique to processing of card member returns by means of a return logic policy in accordance with an embodiment of the present invention are now described with reference to FIGS. 11 and 12. In these figures "TM tx" represents CM transactions which were eligible for a rebate credit in accordance with the TailorMade$^{SM}$ registered card program described herein. FIG. 11 provides examples of actions taken in response to returns. For example, in line 1 of FIG. 11, a $1,000 return is made on Sep. 1, 2006. In response to this return, TAP will take no action with respect to debiting any rebate credit, because there were no transactions made in the prior 60 days to correspond to the $1,000 return. In line 2, for the same return, it is determined that there was a $1,000 purchase within the prior 60 days along with a $100 statement credit. Therefore, it is assumed that the $100 statement credit was a rebate credit that must be debited. In line 3, a $400 return is made. In this case, a proportional $40 debit is made to correspond to the portion of the rebate credit on the $400 purchase that was returned. Additional examples and assumptions/rationales are provided in FIG. 11.

Figure 12:
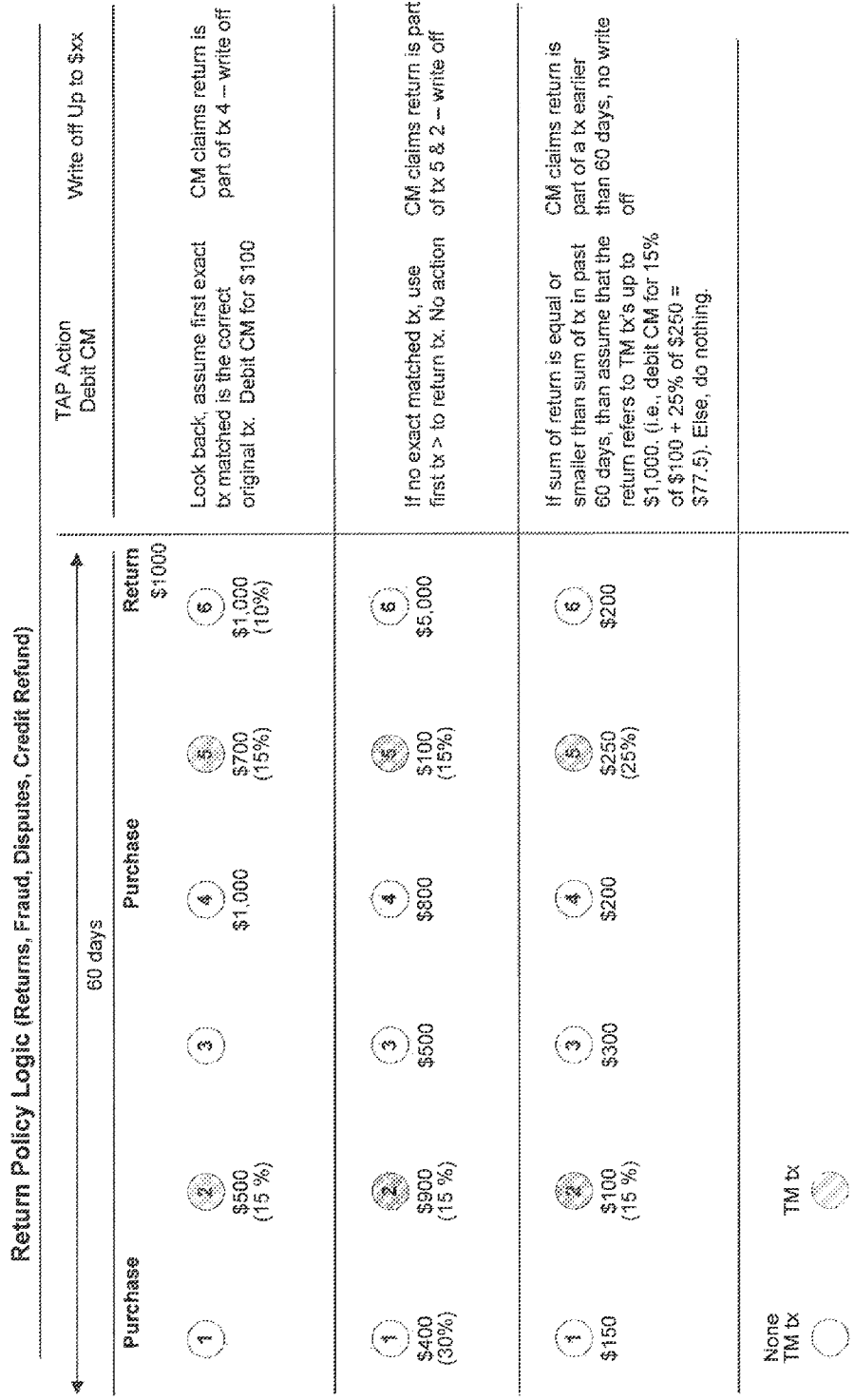
FIG. 12 is a diagram of another method for determining whether a return was made on a purchase in which the card member received a discount credit, in accordance with another embodiment of the present invention.

FIG. 12 provides additional examples of return policy logic in which a CM may be debited for identified rebate credit(s) on TM (TailorMade$^{SM}$) transactions. As shown in FIG. 12, if the CM is debited for identified rebate credit(s), and if the CM disputes the credit and claims that the return is part of a non-TM transaction (i.e., a transaction in which the CM did not receive a rebate credit), then the rebate credit is written off of CM's account. For example, in the line 1 of FIG. 12, a return is made for $1000, and it assumed that the return is associated the first exact transaction in the past 60 days for that is the same amount as the return. In this example, transaction "6" is the first transaction of $1000, and the return is associated with transaction "6." Since transaction "6" was discounted 10%, whereby the CM received a rebate credit of $100, then the CM is debited the $100. If the CM disputes the debit, such as by claiming that the return is in fact part of transaction "4," then the debit is written off, since transaction "4" was not subject to a discount, if in line 1 there is no exact matched transaction identified with the return, then, in line 2, the first transaction in the past 60 days which is greater than the amount of the return is identified with the return. As shown in line 2, transaction "6" for $5000 is the first matched transaction having an amount greater than the return. Since transaction "6" was not discounted, then no action is taken with regard to debiting CM. If CM claims that the return is part of transaction "5" and "2", then a debit from the CM's account is made in the amount of the rebate credits (15% and 15%) for those transactions. If there is no transaction matched in lines 1 or 2, then in line 3, if the sum of the return is equal or smaller than the sum of all transactions in the past 60 days, then it is assumed that the return refers to TM transactions up to $1000, and a debit to CM's account is provided in accordance with the discounts on TM transactions 2 and 5.

Figure 9:
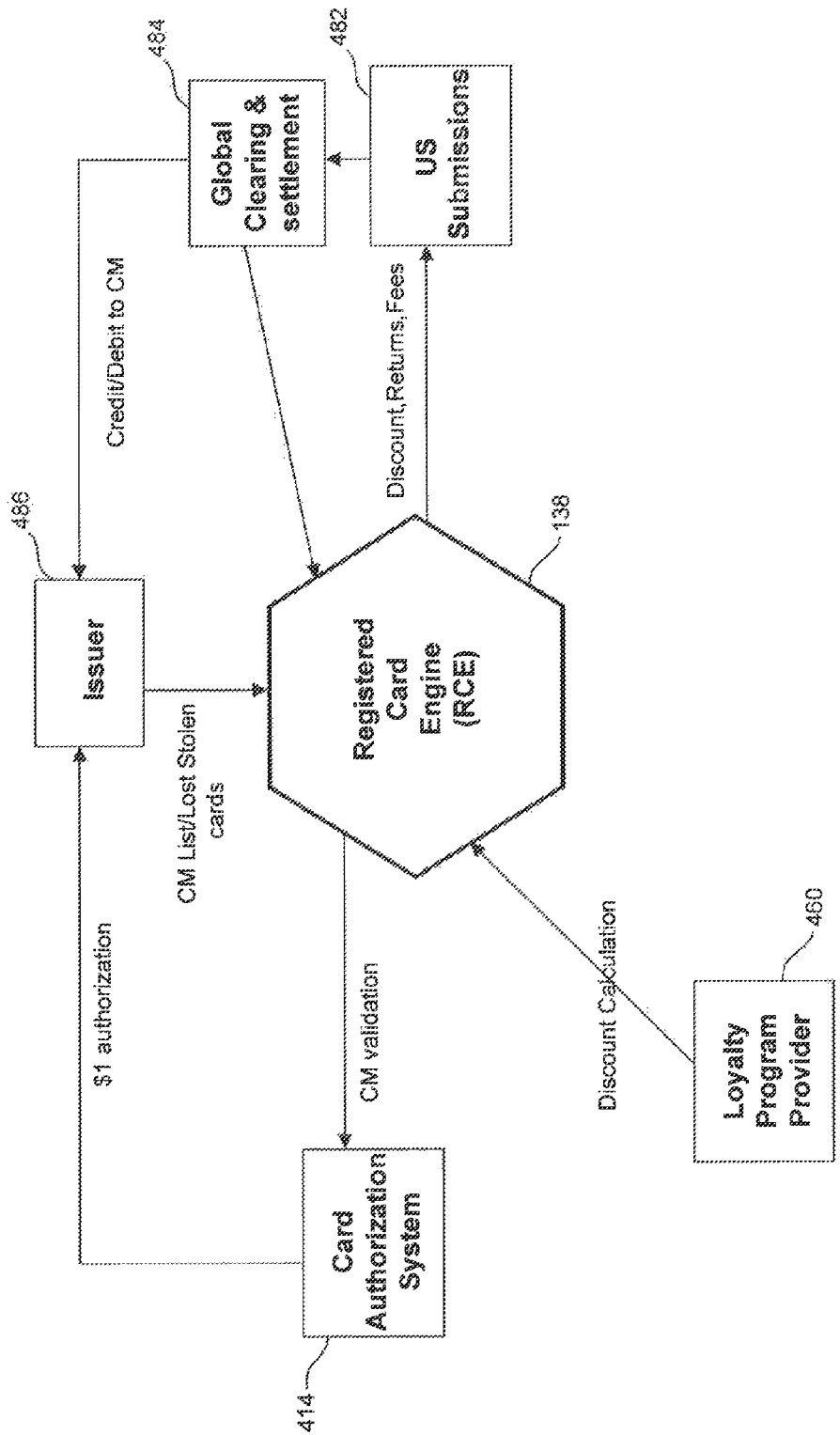
FIG. 9 is a high level flow diagram of a process of providing loyalty incentives to a card member customer using a transaction card issued by a third party transaction account provider.
Figure 10:
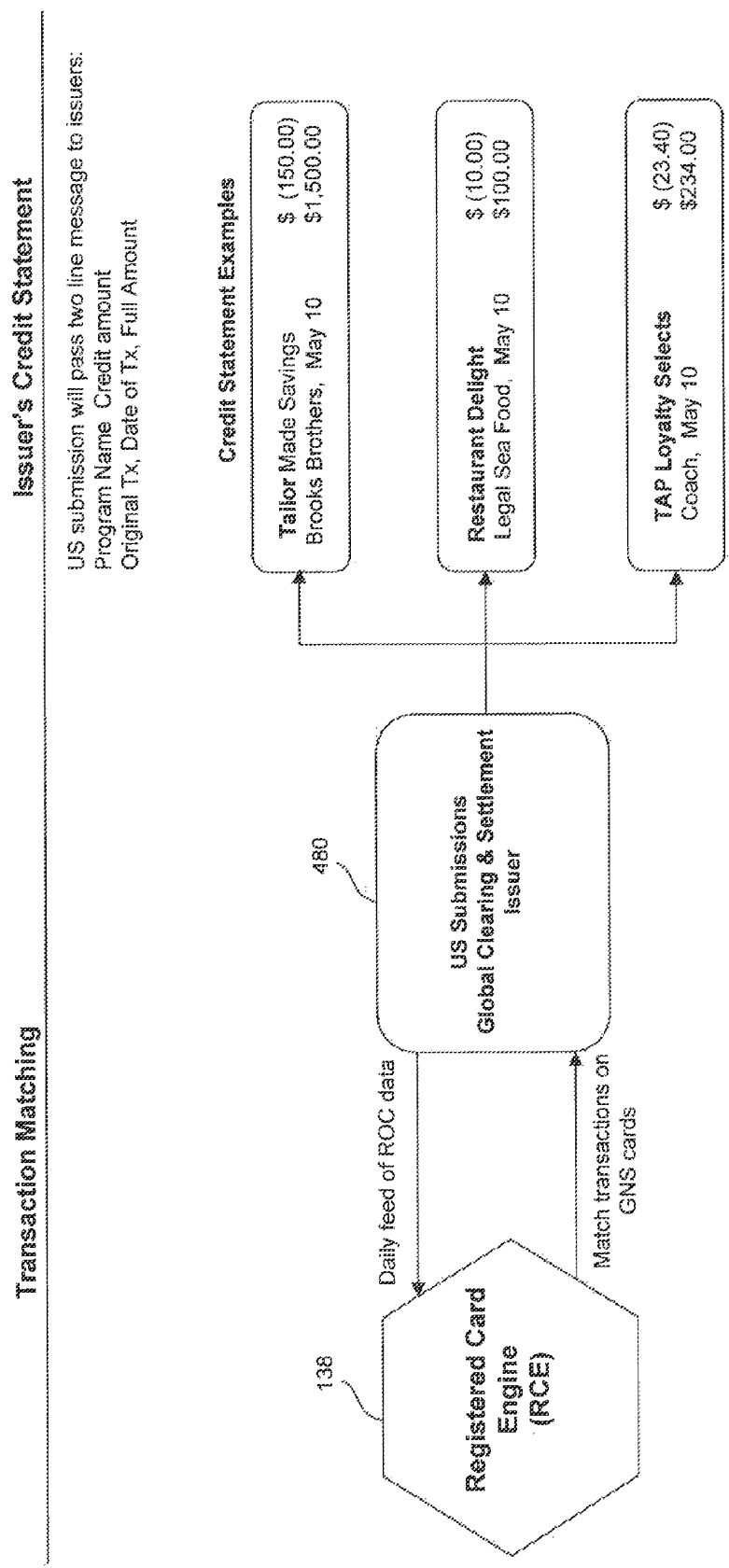
FIG. 10 is another high level flow diagram of the process of FIG. 9, providing an exemplary credit statement of the third party transaction account provider, in accordance with an embodiment of the present invention.

FIGS. 9 and 10 show high level flow diagrams of a process for transaction matching (via RCE 138) of registered GNS cards. As shown in FIG. 9, transactions deserving of discounts or discount reversals as well as any service fees are provided to U.S. Submissions 482 which is placed at global clearing and settlement 484, which is a repository for collection by GNS issuers 486 for processing of credits and debits on GNS cards held by registered CMs (referred to as "GNS CMs"). Global clearing and settlement 484 is also a repository for daily ROC data that is submitted to RCE 138 for transaction matching. Although not shown here, GNS issuers 486 provide TAP with information on GNS accounts held by registered CMs to permit transaction matching, and also to permit enrollee database 134 to be updated according to cancellations 440 (as described above with reference to FIG. 4). In an embodiment shown in FIG. 9, card authorization system 414 may involve a one dollar authorization by which the CM's card is validated at enrollment. As shown in FIGS. 9 and 10, U.S. submissions 482 receives discount, returns, and service fee information from RCE 138 that is used by GNS issuers 486 to settle with merchants and GNS CMs. U.S. submissions 482 passes a two line message to GNS issuers 486, which appears on the respective issuer's credit statement. A similar two line message may be provided on GNS CM's account statement, thereby providing transparency of the settlement of transactions made pursuant to TAP's registered card program to both GNS CMs and CMs holding cards issued by TAP, such as in the manner described above with reference to FIG. 2, III. Example Implementations The present invention or any part(s) or function(s) thereof may be implemented using hardware, software or a combination thereof and may be implemented in one or more computer systems or other processing systems. However, the manipulations performed by the present invention were often referred to in terms, such as matching or selecting, which are commonly associated with mental operations performed by a human operator. No such capability of a human operator is necessary, or desirable in most cases, in any of the operations described herein which form part of the present invention. Rather, the operations may be machine operations. Useful machines for performing the operation of the present invention include general purpose digital computers or similar devices.

Figure 13:
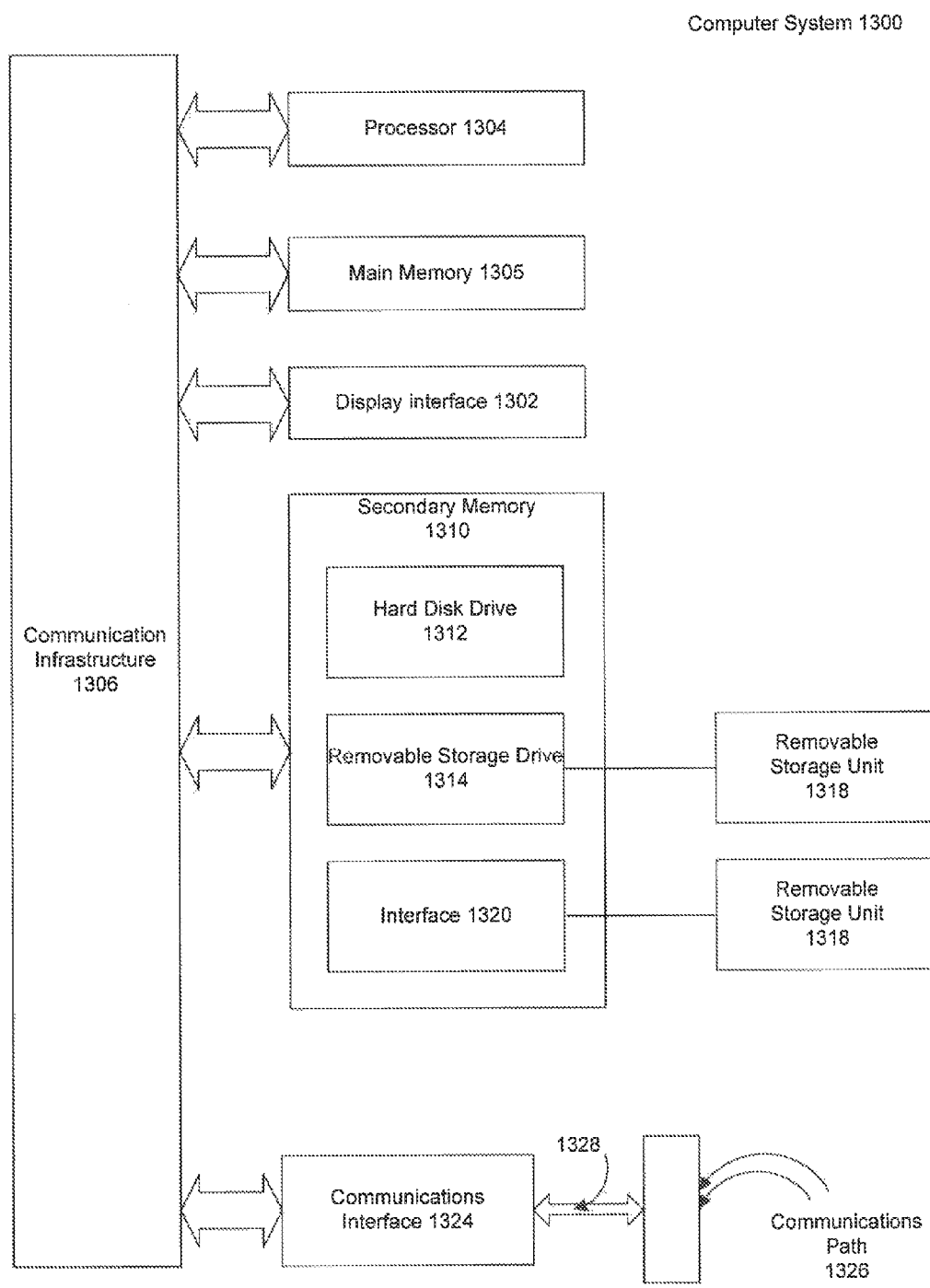
FIG. 13 is a block diagram of an exemplary computer system used for implementing the present invention.

In fact, in one embodiment, the invention is directed toward one or more computer systems capable of carrying out the functionality described herein. An example of a computer system 1300 is shown in FIG. 13, The computer system 1300 includes one or more processors, such as processor 1304. The processor 1304 is connected to a communication infrastructure 1306 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures, Computer system 1300 can include a display interface 1302 that forwards graphics, text, and other data from the communication infrastructure 1306 (or from a frame buffer not shown) for display on the display unit 1330.

Computer system 1300 also includes a main memory 1308, preferably random access memory (RAM), and may also include a secondary memory 1310. The secondary memory 1310 may include, for example, a hard disk drive 1312 and/or a removable storage drive 1314, representing a floppy disk drive, a magnetic tape drive, an optical disk drive, etc. The removable storage drive 1314 reads from and/or writes to a removable storage unit 1318 in a well known manner. Removable storage unit 1318 represents a floppy disk, magnetic tape, optical disk, etc., which is read by and written to by removable storage drive 1314. As will be appreciated, the removable storage unit 1318 includes a computer usable storage medium having stored therein computer software and/or data.

In alternative embodiments, secondary memory 1310 may include other similar devices for allowing computer programs or other instructions to be loaded into computer system 1300. Such devices may include, for example, a removable storage unit 1318 and an interface 1320. Examples of such may include a program cartridge and cartridge interface (such as that found in video game devices), a removable memory chip (such as an erasable programmable read only memory (EPROM), or programmable read only memory (PROM)) and associated socket, and other removable storage units 1318 and interfaces 1320, which allow software and data to be transferred from the removable storage unit 1318 to computer system 1300.

Computer system 1300 may also include a communications interface 1324. Communications interface 1324 allows software and data to be transferred between computer system 1300 and external devices. Examples of communications interface 1324 may include a modem, a network interface (such as an Ethernet card), a communications port, a Personal Computer Memory Card International Association (PCMCIA) slot and card, etc. Software and data transferred via communications interface 1324 are in the form of signals 1328 which may be electronic, electromagnetic, optical or other signals capable of being received by communications interface 1324. These signals 1328 are provided to communications interface 1324 via a communications path (e.g., channel) 1326. This channel 1326 carries signals 1328 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1314 and a hard disk installed in hard disk drive 1312. These computer program products provide software to computer system 1300. The invention is directed to such computer program products.

Computer programs (also referred to as computer control logic) are stored in main memory 1308 and/or secondary memory 1310. Computer programs may also be received via communications interface 1324. Such computer programs, when executed, enable the computer system 1300 to perform the features of the present invention, as discussed herein. In particular, the computer programs, when executed, enable the processor 1304 to perform the features of the present invention. Accordingly, such computer programs represent controllers of the computer system 1300.

In an embodiment where the invention is implemented using software, the software may be stored in a computer program product and loaded into computer system 1300 using removable storage drive 1314, hard drive 1312 or communications interface 1324. The control logic (software), when executed by the processor 1304, causes the processor 1304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software, While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may he utilized (and navigated) in ways other than that shown in the accompanying figures.

What is claimed is:

1. A method comprising:
   associating, by a reward card engine of a computer based system, a registration identifier with a transaction account,
      wherein the transaction account is associated with a rewards program based on transaction account identifying information and the transaction account satisfying eligibility criteria, and
      wherein the registration identifier indicates that the transaction account is associated with the rewards program;
   creating, by an offer registration system of the computer based system, active offers in response to receiving offer parameters and merchant information from one or more merchants,
      wherein the active offers and the offer parameters are stored in an offer database;
   associating, by the offer registration system of the computer based system, the active offers with the transaction account,
      wherein the active offers are associated with the transaction account based on the offer parameters;
   receiving, by the computer based system, transaction information for a transaction at the merchant;
   determining, by the computer based system, that the transaction information is associated with the registration identifier;
   determining, by the computer based system, that the transaction is associated with the transaction account and the rewards program based on the registration identifier and the transaction information;
   authorizing, by the computer based system, the transaction with the merchant,
      wherein the authorization is based on an amount of available credit associated with the transaction account;
   reducing, by the computer based system, the amount of available credit for the transaction account by a transaction amount included with the authorization;
   receiving, by the computer based system, the transaction information for the transaction from the merchant as part of a settlement operation for the transaction between the merchant and a transaction account issuer;
   determining, by the computer based system, the merchant from which the transaction was initiated;
   generating, by the computer based system and in response to the settlement operation, a list of the one or more merchants with the active offers which is a subset of the active offers from the one or more merchants;
   analyzing, by the computer based system, the merchant against the list of the one or more merchants with the active offers;
   analyzing, by the computer based system, the transaction information to determine that the transaction satisfies the offer parameters for an offer,
      wherein the offer is one of the active offers;
   selecting, by the computer based system and in response to the satisfying, the offer;
   linking, by the computer based system and in response to the selecting, the offer with the registration identifier;
   associating, by the computer based system and in response to the linking with the registration identifier, the offer with the transaction account based on the registration identifier;
   determining, by the computer based system, an amount of a reward based on the offer parameters; and
   crediting, by the computer based system, the amount of the reward to the transaction account in response to the transaction information satisfying transaction criteria.

2. The method of claim 1, further comprising adjusting, by the computer based system, the amount of the available credit for the transaction account, in response to the crediting the reward.

3. The method of claim 1, further comprising associating, by the computer based system, the transaction account with the rewards program in response to receiving the transaction account identifying information.

4. The method of claim 1, wherein the registration identifier is assigned to the transaction account in response to associating the transaction account with the rewards program.

5. The method of claim 1, wherein the offer is provided to the user via an electronic communication.

6. The method of claim 1, the offer is coupon-less.

7. The method of claim 1, wherein an indicator of the amount of the reward is shown on a statement in connection with the transaction.

8. The method of claim 1, wherein the reward is loyalty points.

9. The method of claim 1, wherein the reward has a monetary value.

10. The method of claim 1, wherein the transaction information relates to at least one of authorization information, payment information, settlement information, dispute information or acquirer information.

11. The method of claim 1, further comprising determining, by the computer based system, a debit and a credit associated with the reward.

12. The method of claim 1, further comprising applying, by the computer based system, a debit to a merchant account for the merchant associated with the transaction.

13. The method of claim 1, wherein the reward has a cost and wherein the cost is associated with the merchant.

14. The method of claim 1, wherein the transaction information is a record of charge.

15. The method of claim 1, further comprising:
providing, by the computer based system, a return credit to the transaction account in response to a return; and
determining, by the computer based system, that the return relates to transaction information for which a rebate credit was provided, wherein in response to the return relating to the transaction information for which the reward was provided, debiting the transaction account by at least a portion of the amount of the reward.

16. The method of claim 15, wherein the determining step comprises:
searching, by the computer based system, for the transaction information for the transaction made with the merchant, wherein the transaction information includes a transaction date occurring within a given time period prior to a date of the return; and
in response to the transaction information being found, identifying that the reward was provided in relation to the transaction.

17. The method of claim 1, wherein the reward is at least one of a discount or a rebate.

18. The method of claim 1, wherein the computer based system is operated by at least one of the transaction account issuer, a loyalty program provider, or an acquirer.

19. A tangible, non-transitory computer-readable storage medium having computer-executable instructions stored thereon that, if executed by a computer based system, causes the computer based system to perform a method comprising:
associating, by a reward card engine of the computer based system, a registration identifier with a transaction account,
wherein the transaction account is associated with a rewards program based on transaction account identifying information and the transaction account satisfying eligibility criteria, and
wherein the registration identifier indicates that the transaction account is associated with the rewards program;
creating, by an offer registration system of the computer based system , active offers in response to receiving offer parameters and merchant information from one or more merchants,
wherein the active offers and the offer parameters are stored in an offer database;
associating, by the offer registration system of the computer based system, the active offers with the transaction account,
wherein the active offers are associated with the transaction account based on the offer parameters;
receiving, by the computer based system, transaction information for a transaction at the merchant;
determining, by the computer based system, that the transaction information is associated with the registration identifier;
determining, by the computer based system, that the transaction is associated with the transaction account and the rewards program based on the registration identifier and the transaction information;
authorizing, by the computer based system, the transaction with the merchant,
wherein the authorization is based on an amount of available credit associated with the transaction account;
reducing, by the computer based system, the amount of available credit for the transaction account by a transaction amount included with the authorization;
receiving, by the computer based system, the transaction information for the transaction from the merchant as part of a settlement operation for the transaction between the merchant and a transaction account issuer;
determining, by the computer based system, the merchant from which the transaction was initiated;
generating, by the computer based system and in response to the settlement operation, a list of the one or more merchants with the active offers which is a subset of the active offers from the one or more merchants;
analyzing, by the computer based system, the merchant against the list of the one or more merchants with the active offers;
analyzing, by the computer based system, the transaction information to determine that the transaction satisfies the offer parameters for an offer,
wherein the offer is one of the active offers;
selecting, by the computer based system and in response to the satisfying, the offer;
linking, by the computer based system and in response to the selecting, the offer with the registration identifier;
associating, by the computer based system and in response to the linking with the registration identifier, the offer with the transaction account based on the registration identifier;
determining, by the computer based system, an amount of a reward based on the offer parameters; and
crediting, by the computer based system, the amount of the reward to the transaction account in response to the transaction information satisfying transaction criteria.

20. A system comprising:
a processor;
a tangible, non-transitory memory communicating with the processor; and
the processor, when executing a computer program, is configured to perform operations comprising:
associating, by a reward card engine of the processor, a registration identifier with a transaction account,
wherein the transaction account is associated with a rewards program based on transaction account identifying information and the transaction account satisfying eligibility criteria, and
wherein the registration identifier indicates that the transaction account is associated with the rewards program;
creating, by an offer registration system of the processor , active offers in response to receiving offer parameters and merchant information from one or more merchants,
wherein the active offers and the offer parameters are stored in an offer database; associating, by the offer registration system of the processor, the active offers with the transaction account,
wherein the active offers are associated with the transaction account based on the offer parameters;
receiving, by the processor, transaction information for a transaction at the merchant;
determining, by the processor, that the transaction information is associated with the registration identifier;
determining, by the processor, that the transaction is associated with the transaction account and the rewards program based on the registration identifier and the transaction information;
authorizing, by the processor, the transaction with the merchant, wherein the authorization is based on an amount of available credit associated with the transaction account;

reducing, by the processor, the amount of available credit for the transaction account by a transaction amount included with the authorization;

receiving, by the processor, the transaction information for the transaction from the merchant as part of a settlement operation for the transaction between the merchant and a transaction account issuer;

determining, by the processor, the merchant from which the transaction was initiated;

generating, by the processor and in response to the settlement operation, a list of the one or more merchants with the active offers which is a subset of the active offers from the one or more merchants;

analyzing, by the processor, the merchant against the list of the one or more merchants with the active offers;

analyzing, by the processor, the transaction information to determine that the transaction satisfies the offer parameters for an offer, wherein the offer is one of the active offers;

selecting, by the processor and in response to the satisfying, the offer;

linking, by the processor and in response to the selecting, the offer with the registration identifier;

associating, by the processor and in response to the linking with the registration identifier, the offer with the transaction account based on the registration identifier;

determining, by the processor, an amount of a reward based on the offer parameters; and crediting, by the processor, the amount of the reward to the transaction account in response to the transaction information satisfying transaction criteria.

\* \* \* \* \*